(12) United States Patent
Metlitsky

(10) Patent No.: US 6,347,744 B1
(45) Date of Patent: *Feb. 19, 2002

(54) RETROREFLECTIVE SCAN MODULE FOR ELECTRO-OPTICAL READERS

(75) Inventor: Boris Metlitsky, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/675,954

(22) Filed: Sep. 29, 2000

Related U.S. Application Data

(62) Division of application No. 08/727,944, filed on Oct. 9, 1996, now abandoned.
(60) Provisional application No. 60/005,949, filed on Oct. 10, 1995.

(51) Int. Cl.$^7$ .................................................. G06K 7/10
(52) U.S. Cl. .............................. 235/472.02; 235/462.46
(58) Field of Search ........................... 235/454, 462.46, 235/472.02, 462.45, 472.01, 462.43

(56) References Cited

U.S. PATENT DOCUMENTS

| | | | | |
|---|---|---|---|---|
| 3,826,900 A | * | 7/1974 | Moellering | 235/462.46 X |
| 4,857,716 A | * | 8/1989 | Gombrich et al. | 235/375 |
| 4,906,843 A | * | 3/1990 | Jones et al. | 235/462.45 X |
| 5,367,151 A | * | 11/1994 | Dvorkis et al. | 235/462.45 X |
| 5,479,000 A | * | 12/1995 | Dvorkis et al. | 235/472.01 |
| 5,552,592 A | * | 9/1996 | Dvorkis et al. | 235/462.17 |
| 5,811,786 A | * | 9/1998 | Rockstein et al. | 235/472.01 |
| 6,000,619 A | * | 12/1999 | Reddersen et al. | 235/462.45 |
| 6,149,062 A | * | 11/2000 | Danielson et al. | 235/472.01 |

FOREIGN PATENT DOCUMENTS

| | | | |
|---|---|---|---|
| JP | 1-276862 | * | 11/1989 |
| JP | 8-44810 | * | 2/1996 |
| JP | 11-231909 | * | 8/1999 |

* cited by examiner

Primary Examiner—Karl D. Frech
Assistant Examiner—Jared J. Fureman
(74) Attorney, Agent, or Firm—Kirschstein, et al.

(57) ABSTRACT

An electro-optical, retroreflective scanning module has a base, a first circuit board, and a second circuit board mounted orthogonal to the first circuit board. The base supports a light emitter for producing a scanning beam. The beam reflects off a generally planar scan mirror affixed to a stationary concave collection mirror, to a reflector mounted on a drive for oscillation. A detector included in the module senses light reflected from an indicia scanned by the beam. The reflected light is reflected off the reflector and directed to the collection mirror before reaching the detector. The beam and the field of view of the detector are simultaneously scanned.

16 Claims, 20 Drawing Sheets

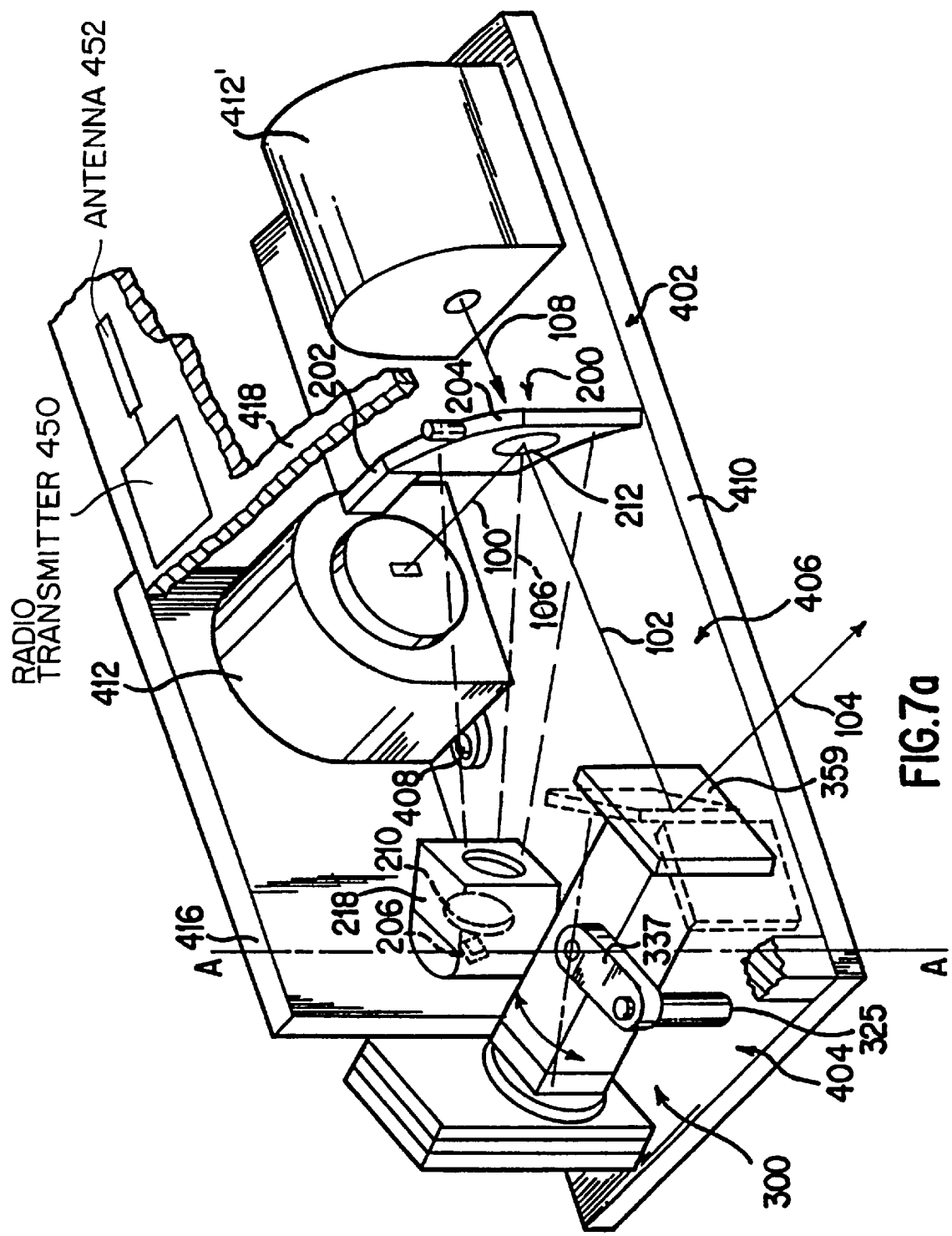

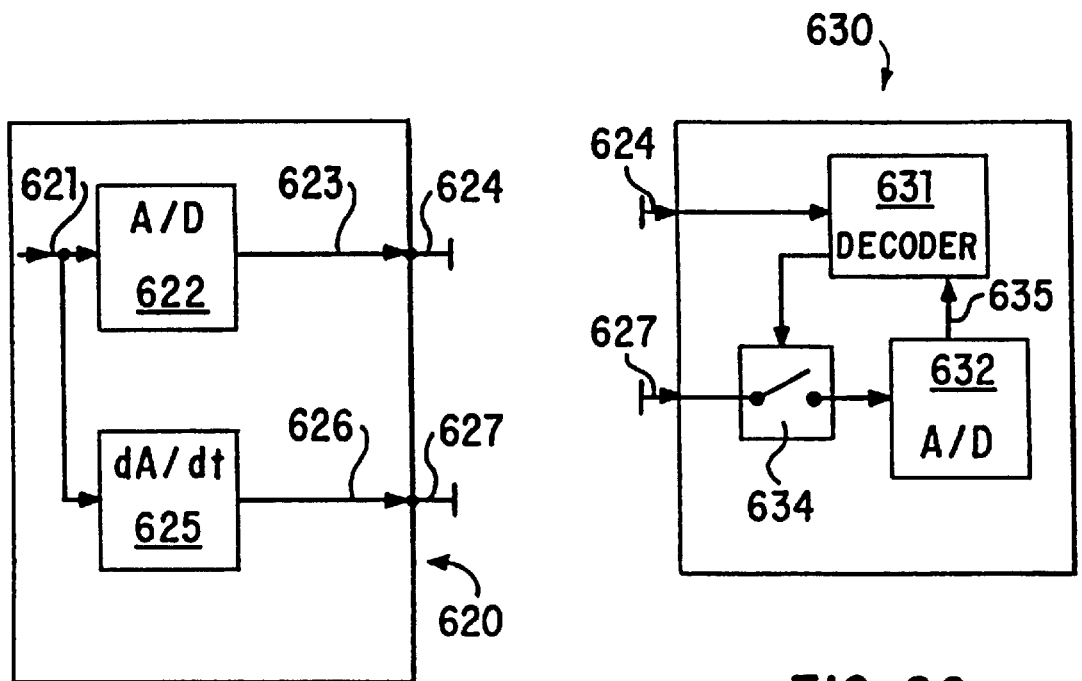
FIG. 25
FIG. 26
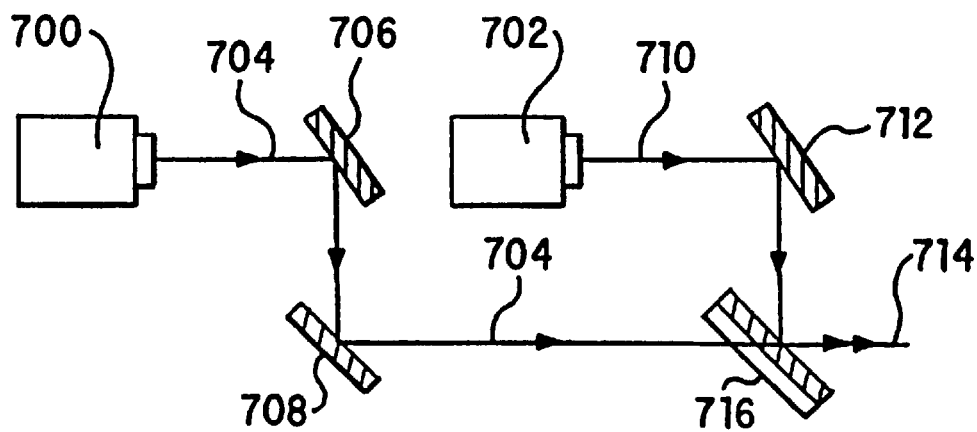
FIG. 27

RETROREFLECTIVE SCAN MODULE FOR ELECTRO-OPTICAL READERS

RELATED APPLICATIONS

This application is a division of U.S. Ser. No. 08/727,944, filed Oct. 9, 1996, abandoned, and claims the benefit of U.S. Provisional application Serial No. 60/005,949, filed Oct. 10, 1995.

BACKGROUND OF THE INVENTION

1. Field of the Invention

The invention relates to electro-optical readers or scanning systems, such as bar code symbol scanners, and more particularly to retroreflective laser scanning modules for use in applications requiring particularly compact scanners.

2. Description of the Related Art

Electro-optical readers, such as bar code symbol readers, are now quite common. Typically, a bar code symbol comprises one or more rows of light and dark regions, typically in the form of rectangles. The widths of the dark regions, i.e., the bars, and/or the widths of the light regions, i.e., the spaces, between the bars indicate encoded information to be read.

A bar code symbol reader illuminates the symbol and senses light reflected from the coded regions to detect the widths and spacings of the coded regions and derive the encoded information. Bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users or employees must be willing to consistently use the readers. The readers therefore must be easy and convenient to operate.

A variety of scanning systems are known. One particularly advantageous type of reader is an optical scanner which scans a beam of light, such as a laser beam, across the symbols. Laser scanner systems and components of the type exemplified by U.S. Pat. Nos. 4,387,297 and 4,760,248—which are owned by the assignee of the instant invention and are incorporated by reference herein—have generally been designed to read indicia having parts of different light reflectivity, i.e., bar code symbols, particularly of the Universal Product Code (UPC) type, at a certain working range or reading distance from a hand-held or stationary scanner.

FIG. 1a illustrates an example of a prior art bar code symbol reader 10 implemented as a gun shaped device, having a pistol-grip type of handle 53. A lightweight plastic housing 55 contains a light source 46, a detector 58, optics 57, signal processing circuitry 63, a programmed microprocessor 40, and a power source or battery 62. A light-transmissive window 56 at the front end of the housing 55 allows an outgoing light beam 51 to exit and an incoming reflected light 52 to enter. A user aims the reader 10 at a bar code symbol 70 from a position in which the reader 10 is spaced from the symbol, i.e. not touching the symbol or moving across the symbol.

As further depicted in FIG. 1a, the optics may include a suitable lens 57 (or multiple lens system) to focus the scanned beam into a scanning spot at an appropriate reference plane. The light source 46, such as a semiconductor laser diode, introduces a light beam into an optical axis of the lens 57, and the beam passes through a partially-silvered mirror 47 and other lenses or beam shaping structures as needed. The beam is reflected from an oscillating mirror 59 which is coupled to a scanning drive motor 60 energized when a trigger 54 is manually pulled. The oscillation of the mirror 59 causes the outgoing beam 51 to scan back and forth in a desired pattern.

A variety of mirror and motor configurations can be used to move the beam in a desired scanning pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternative circumferential directions about a drive shaft on which the multi-mirror construction is mounted.

The light 52 reflected back by the symbol 70 passes back through the window 56 for transmission to the detector 58. In the exemplary reader 10 shown in FIG. 1a, the reflected light reflects off of mirror 59 and partially-silvered mirror 47 and impinges on the light sensitive detector 58. The detector 58 produces an analog signal proportional to the intensity of the reflected light 52.

The signal processing circuitry includes a digitizer 63 mounted on a printed circuit board 61. The digitizer processes the analog signal from detector 58 to produce a pulse signal where the widths and spacings between the pulses correspond to the widths of the bars and the spacings between the bars. The digitizer serves as an edge detector or wave shaper circuit, and a threshold value set by the digitizer determines what points of the analog signal represent bar edges. The pulse signal from the digitizer 63 is applied to a decoder, typically incorporated in the programmed microprocessor 40 which will also have associated program memory and random access data memory. The microprocessor decoder 40 first determines the pulse widths and spacings of the signal from the digitizer. The decoder then analyses the widths and spacings to find and decode a legitimate bar code message. This includes analysis to recognize legitimate characters and sequences, as defined by the appropriate code standard. This may also include an initial recognition of the particular standard to which the scanned symbol conforms. This recognition of the standard is typically referred to as autodiscrimination.

To scan the symbol 70, the user aims the bar code reader 10 and operates movable trigger switch 54 to activate the light source 46, the scanning motor 60 and the signal processing circuitry. If the scanning light beam 51 is visible, the operator can see a scan pattern on the surface on which the symbol appears and adjust aiming of the reader 10 accordingly. If the light beam 51 produced by the source 46 is marginally visible, an aiming light may be included. The aiming light, if needed, produces a visible-light spot which may be fixed, or scanned just like the laser beam 51. The user employs this visible light to aim the reader at the symbol before pulling the trigger.

The reader 10 may also function as a portable data collection terminal. If so, the reader 10 would include a keyboard 48 and a display 49, such as described in the previously noted U.S. Pat. No. 4,409,470.

In electro-optical scanners of the type discussed above, the "scan engine" including the laser source, the optics the mirror structure, the drive to oscillate the mirror structure, the photodetector, and the associated signal processing and decoding circuitry all add size and weight to the scanner. In applications involving protracted use, a large heavy hand-held scanner can produce user fatigue. When use of the scanner produces fatigue or is in some other way inconvenient, the user is reluctant to operate the scanner. Any reluctance to consistently use the scanner defeats the data gathering purposes for which such bar code systems are intended. Also, a need exists for compact scanners to fit into small compact devices, such as notebooks.

Thus an ongoing objective of bar code reader development is to miniaturize the reader as much as possible, and a need still exists to further reduce the size and weight of the scan engine and to provide a particularly convenient to use scanner. The mass of the moving components should be as low as possible to minimize the power required to produce the scanning movement.

It is also desirable to modularize the scan engine so that a particular module can be used in a variety of different scanners. A need exists, however, to develop a particularly compact, lightweight module which contains all the necessary scanner components.

Smaller size scanning components tend to operate at higher scanning frequencies. In typical bar code scanning applications, however, the scanning frequency of the moving beam spot should be relatively low, typically 20 Hz or less. If the frequency increases, the speed of the spot as it passes over the symbol increases. The signals produced by the detector also increase in frequency, and consequently the bandwidth of the processing circuitry for analysing the detector signals must be increased. Also, operation at higher scanning frequencies generally produces detector signals which include higher levels of noise, making accurate decoding more difficult.

SUMMARY OF THE INVENTION

Objects of the Invention

The objective of this invention is to develop an entirely self-contained, electro-optical, retroreflective scanning module, including all components necessary to generate the light beam, scan the beam in a pattern across a symbol, detect light reflected back by the symbol and process signals representative of the reflected light. In this regard, the retroreflective module should be small, lightweight and easy to incorporate into a variety of different types of electro-optical scanning systems.

Another objective of this invention is to minimize the size and weight of the components used to produce the scanning motion of the light beam, and to collect the reflected light.

Another related objective is to develop an electro-optical scanning system which is smaller and lighter in weight, when held by an operator, and which it is easier to manipulate to scan encoded indicia, as compared to known system.

Features of the Invention

In keeping with these objects, one feature of this invention is embodied in a self-contained, electro-optical, retroreflective scanning module for reading optically encoded indicia having parts of different light reflectivity. The module includes a base; a light source on the base, for emitting a light beam along an outgoing path toward the indicia for reflection therefrom; a light detector on the base, for detecting light reflected from the indicia along an incoming path over a field of view, and for generating electrical signals corresponding to the indicia parts of different light reflectivity; a movable reflector mounted in the paths of the light beam and the reflected light; and a drive on the base, for moving the movable reflector to sweep the light beam across the indicia, and to simultaneously sweep the field of view.

In accordance with this invention, the light source is mounted in a casing, and a stationary collecting mirror is fixedly mounted on the casing, and a stationary scan mirror is fixedly mounted on the collecting mirror. Advantageously, the collecting mirror is concavely curved, and the scan mirror is planar. Also, a bracket holds the mirrors at a distance from the casing.

Another advantageous aspect of this invention is embodied in fixedly mounting the casing and the mirrors at one of two end regions of the base, and in mounting the movable reflector for movement at the other of the end regions of the base. The light detector is mounted at a central region of the base and faces the collecting mirror, and is located at the centre of curvature thereof.

The drive includes an elongated support having opposite end portions. The reflector is mounted at one of the end portions of the support. The drive includes a permanent magnet mounted at the other of the end portions of the support, and an electromagnetic coil mounted in proximity to the permanent magnet and operative, when an alternating drive signal is applied to the coil, for producing an alternating magnetic field which acts on the permanent magnet to oscillate the magnet and, in turn, the support and the reflector mounted thereon about an axis located approximately midway between the reflector and the permanent magnet.

The resulting compact construction enables the retroreflective module to be placed within a variety of system configurations, especially miniature ones.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings. Further features of the invention are set out in the appended independent claims, and further preferred features are set out in the dependent claims.

BRIEF DESCRIPTION OF THE DRAWINGS

FIG. 7a is a perspective view of another embodiment of a scanning module in accordance with this invention;

FIG. 13b shows an alternative aperture shape to that of FIG. 13a;

FIG. 13c shows an alternative aperture shape to that of FIG. 13a;

FIG. 25 shows a portion of a conventional scanning module;

FIG. 26 shows a decoder module according to another aspect of the present invention; and FIG. 27 shows a "back to back" dual laser arrangement according to another aspect of the invention.

DETAILED DESCRIPTION OF THE PREFERRED EMBODIMENTS

As used in this specification and in the appended claims, the term "indicia" broadly encompasses not only symbol patterns composed of alternating bars and spaces of various widths commonly referred to as bar code symbols, but also another one or two dimensional graphic patterns, as well as alphanumeric characters. In general, the term "indicia" may be recognized of pattern or information which may be recognized or identified by scanning a light beam and detecting reflected or scattered light as a representation of variations in light reflectivity at various points of the pattern or information. A bar code symbol is one example of an "indicia" which the present invention can scan.

Figure 2:
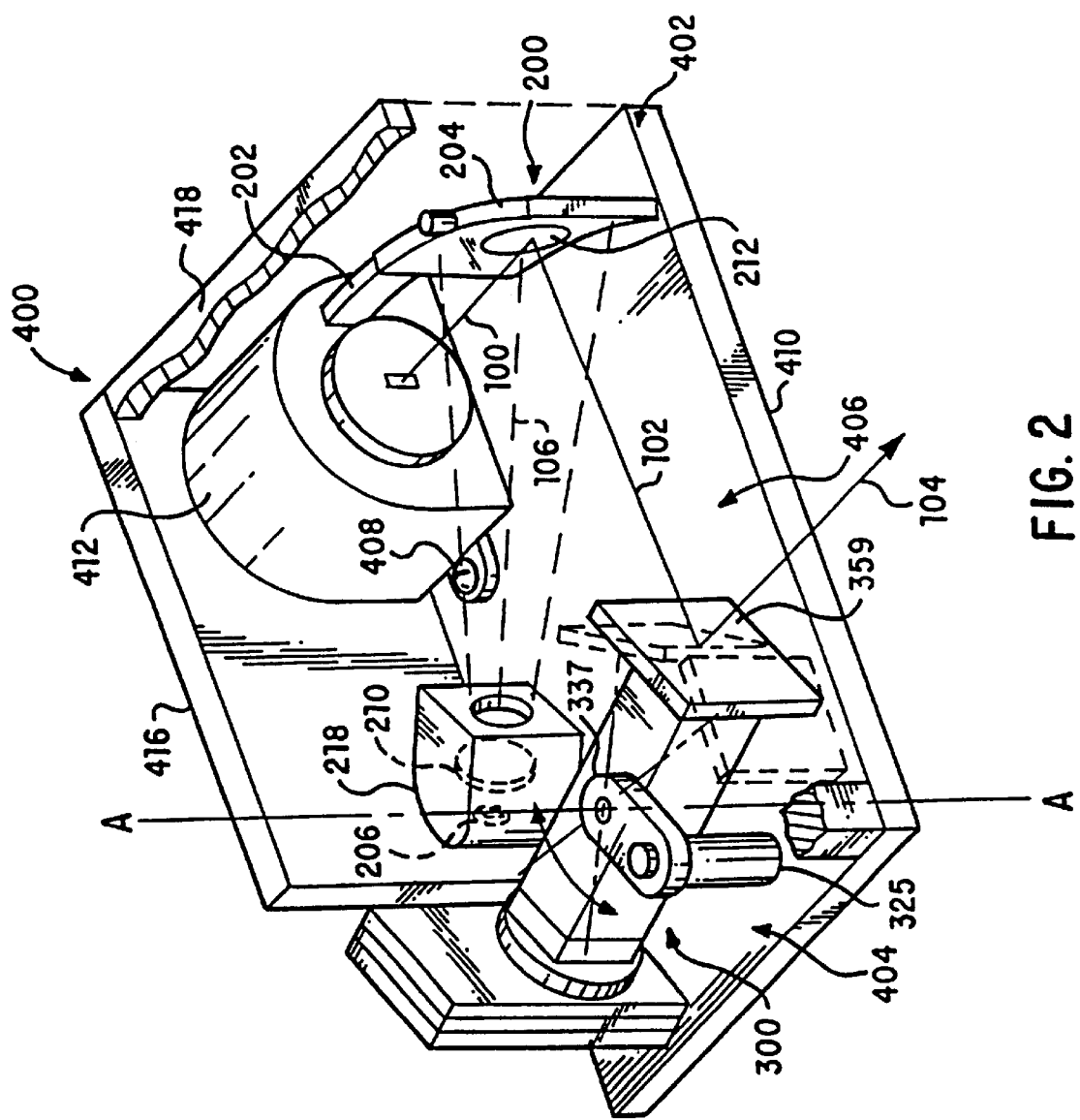
FIG. 2 is a perspective view of one embodiment of a scanning module in accordance with the invention, with certain parts broken away for clarity.

FIGS. 2 to 6 show the construction of a small sized, self-contained, retroreflective scanning module 400. The module 400 is substantially rectangular and in one example was made as small as 1.35"×0.95"×0.69". A perspective view of the module 400, with certain portions removed, is shown in FIG. 2.

Whilst the scanning module is discussed hereafter with reference to a gun-type scanner it will be appreciated that it would also be suitable to incorporate the module in any appropriate system for example a scanner terminal including a scanner portion and a key pad and/or display screen.

The module includes a generally planar, elongated, metal base 410, typically formed of aluminum. Base 410 has one end region 402, an opposite end region 404, and an intermediate or central region 406. A semi-cylindrical casing or housing 412 contains a laser diode and a focusing module similar to those shown in U.S. Pat. No. 5,367,151 owned by the assignee of the instant application, and whose disclosure is incorporated herein by reference hereto.

As shown, the casing 412 is bolted at bolt 408 to, but could also be integrally formed as a section of, the base 410. The casing 412 and the case 410 serve as a heat sink to dissipate heat generated by the laser diode during scanning operations.

The module 400 includes two circuit boards positioned at right angles to each other. A first circuit board 416, mounted orthogonal to the base 410 at one end thereof, supports part of the circuitry used by the scanner. Typically, the first circuit board 416 supports the circuitry for producing the current to drive the laser diode.

A second circuit board 418 is mounted orthogonal to the first circuit board and parallel to the base 410. Assuming that the flat major surface of the base 410 is the bottom of the module 400, the second circuit board 418 would form the top of the module 400. A flexible electric cable (not illustrated) connects the circuitry on the first and second circuit boards together. The second circuit board 418 supports the remainder of the necessary circuitry. Of particular note, the board 418 supports an application specific integrated circuit 419 which includes the analog signal processing circuitry, the digitizer and may include the microprocessor-based decoder.

Figure 3:
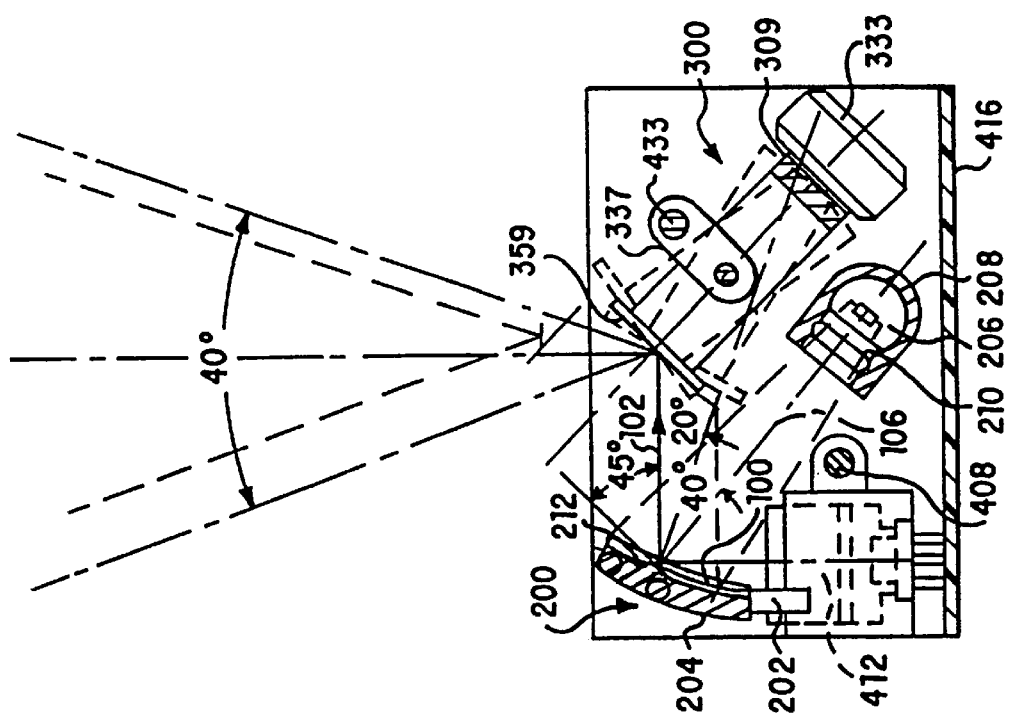
FIG. 3 is a top plan view of the module of FIG. 2, again with certain parts removed to show the interior of the module.
Figure 4:
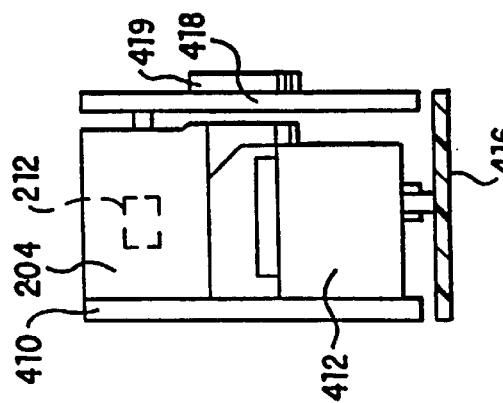
FIG. 4 is a left side elevational view of the module of FIG. 2.

FIG. 3 is a top view of the module 400, taken as if the second circuit board 418 were omitted, to provide an illustration of the interior of the module. As shown, a support structure 300 provides flexible support for a reflector 359 so as to permit reciprocal motion of the reflector. The flexible support structure is described below in connection with FIG. 6.

The interior of the module also contains a stationary mirrored structure 200 fixed to the casing 412 by a bracket 202 at end region 402 of the base. The mirrored structure 200 includes a concavely curved collection mirror 204 having a centre of curvature at which a photodetector 206 is located. The photodetector 206 is mounted at the central region 406 of the base 410 within a housing 208. A filter 210 is located upstream of the photodetector 206 within the housing 208.

A louvre of a known type can be placed in front of the photodetector 206 although this is not shown in the drawings.

A generally planar scan mirror 212 is fixedly mounted on the collection mirror 204, and preferably is integrally formed and molded as one-piece therewith. The scan mirror 212 is inclined and faces both the laser diode within the casing 412, as well as the reflector 359. The front surfaces of the mirrors 204, 212 are provided with a light-reflective coating.

Figure 6:
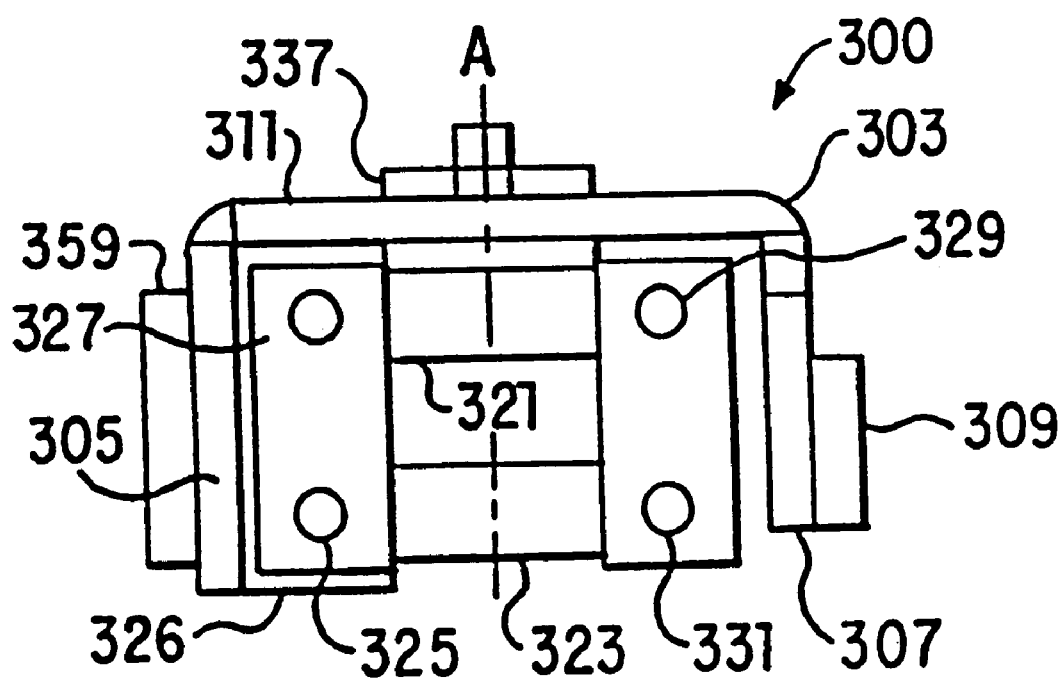
FIG. 6 is an elevational view of a drive component of the module of FIG. 2.

As shown in FIG. 6, the support structure 300 includes a U-shaped member 303 having a first arm 305 to which the reflector 359 is attached. A second arm 307 of the member 303 supports a permanent magnet 309. A straight section 311 extends between and connects the first and second arms together to form the U-shape of member 303.

A pair of flexible strips 321,323 connects to one of the arms of the U-shaped member 303 and serves as a planar spring. These spring strips comprise a flat sheet of flexible plastic material such as Mylar™ or Kapton™ film, or other flexible elements such as a flat strip of non-magnetic metal like a beryllium-copper alloy. In the illustrated rest position, the strips 321,323 remain in a relatively unflexed state and extend in a direction substantially parallel to the straight section 311 in the space between the first arm 303 and the second arm 307. One set of ends of the strips 321,323 connects to the first arm 305, and the opposite set of ends of the strips 321,323 is fixed.

More specifically, the ends of the Mylar™ or Kapton™ material sheets forming the flexible strips 321,323 are fastened by suitable fasteners 325 and thereby clamped between a plate 327 and a frame member 326 extending from the rear surface of first arm 305 and a portion of the lower surface of the straight section 311. The opposite ends of the strips 321,323 are fastened to a fixed support by suitable fasteners 329 which clamp the strips between a plate 331 and an enlarged portion of a stationary arm 337 extending out from a support pedestal 335 (FIG. 2). The support pedestal 335 is mounted on the flat section of the metal base 410 at the end region 404.

The components of the support structure 300, the reflector 359 and the magnet 309 are dimensioned such that the weight of the magnet balances the weight of the reflector with respect to a pivot axis A approximately half way between the reflector and the magnet. As a result, the strips 321,323 function as planar leaf spring elements and flex about that pivotal axis. The pivot axis A extends perpendicular to the flat lower portion of the base 410 (or vertical in FIG. 6).

Figure 5:
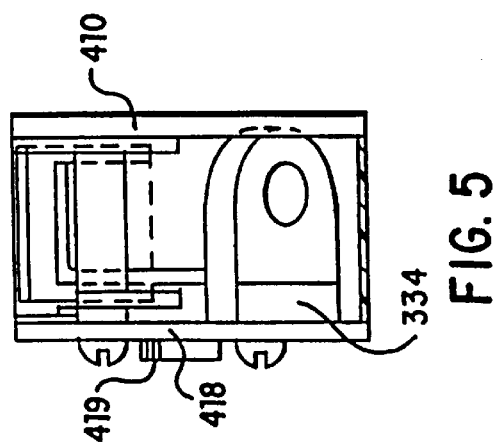
FIG. 5 is a right side elevational view of the module of FIG. 2.

An electromagnetic coil 333 is attached to the lower surface of the second circuit board 418 by a bracket 334 (FIG. 5). Mounting of the second circuit board 418 on the top of the module 400 positions the attached coil 333 in close proximity to the permanent magnet 309, as shown in FIG. 3. The axis between the north and south poles of the permanent magnet 309 is aligned in the plane of the drawing of FIG. 3, i.e. parallel to the flat lower portion of the base 410. When an alternating current is introduced through the coil of the electromagnet 333, interaction between magnetic fields of the coil and the permanent magnet 309 produce an oscillatory movement of the permanent magnet 309 and a rotational oscillation of the attached member 303 against the return forces produced by the flat planar spring strips 321,323. The flexible strips 321,323 twist back and forth about the axis A causing the member 303 to vibrate, and the mirror 359 reciprocates in both circumferential directions through an arc about the axis A.

When the laser diode emits a light beam, this light beam travels along path portion 100 and impinges on the scan mirror 212 and, in turn, is reflected along path portion 102 to the reflector 359 which, in turn, reflects the light beam along path portion 104 toward a target surface on which an indicia appears. The beam emerges through an opening formed in a side of the module. The reciprocal vibration of the reflector 359, during emission of the beam from the laser diode, causes the beam to scan a line across the indicia.

If module 400 is horizontally mounted in a scanner the resultant scan line would be horizontal and would scan an indicia having vertical bars. In contrast, if the module 400 is mounted vertically in a scanner, the resultant scan line would be vertical and would scan an indicia having horizontal bars.

The light reflected back by the indicia passes back along path portion 104, whereupon it is reflected along path portion 102 for collection by the concave collection mirror 204. The collection mirror 204, in turn, reflects the returned light along path portion 106 through the ambient light blocking optical filter 210 for application to the detector. The filter blocks most light wavelengths but passes light of a wavelength corresponding to the wavelength of the light beam emitted by the laser diode. A louvre can also be placed in front of the detector.

The detector 206 produces an analog proportional to the intensity of the reflected light which is processed, digitized and may be decoded by the application specific integrated circuit 419. Electrical leads for carrying signals from the detector to the application specific integrated circuit 419 are not illustrated for clarity.

The small size of the flexible support structure 300 provided in the scanning module does not prevent operation at low scanning frequencies. Again, the location of the reflector and magnet at opposite ends of the member 303 positions the weight thereof relatively far from the pivot axis, thereby providing a high moment of inertia. Also, the mass of the moving components is fairly large; and the preferred materials of the springs 321,323 tend to be quite flexible. The high mass, high inertia and spring flexibility, cause the flexible support structure to exhibit a relatively low characteristic frequency of vibration. Thus, the small self-contained scanning module 400 operates at the low scanning frequencies preferred for bar code scanning, such as 20 Hz or less. Also, the module 400 incorporates the balancing of the weight of the reflector and the weight of the permanent magnet which reduces or eliminates undesirable vibrations which might disrupt the scanning motion and minimizes the amount of power which must be applied to initiate motion of the scanning component, making the scanner more efficient.

Figure 7B:
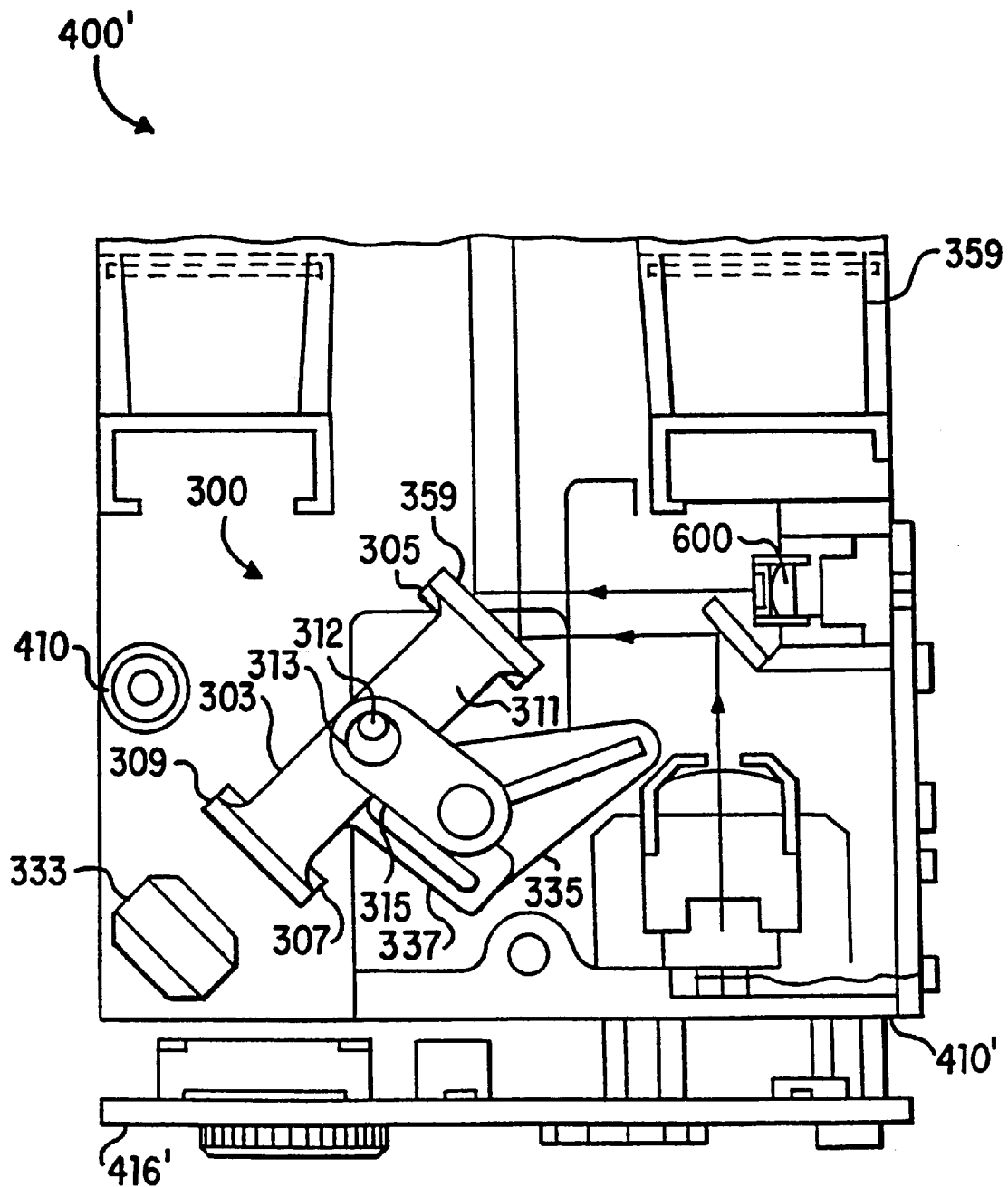
FIG. 7b is a plan view of another embodiment of a scanning module in accordance with this invention.

Although the embodiment discussed above is presented with reference to a single laser arrangement it will be appreciated that more than one laser can be incorporated into the module as appropriate (for example whole dual range scanning as discussed in more detail below). The lasers could be of any known type, for example conventional lasers, laser diodes or a combination thereof. Such an arrangement is shown in FIG. 7b in addition to the scanning assembly shown generally at 300 in this figure, a far laser for scanning more distant items shown at 310a and a near laser for scanning closer items is shown at 310b. The far laser beam is directed by a fold mirror 310c onto the common mirror 359 with the near laser beam.

Figure 1A:
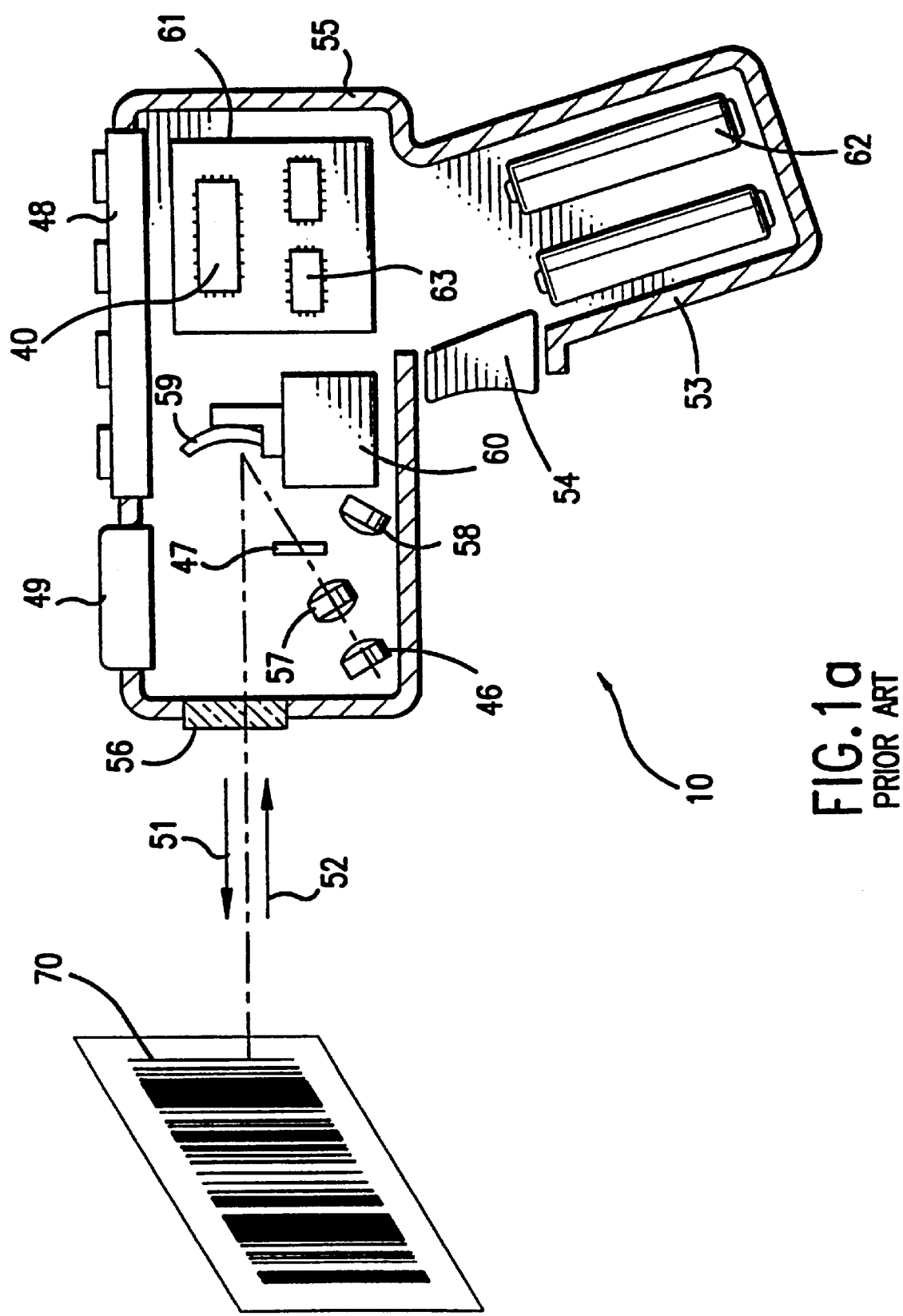
FIG. 1a is a schematic view of a prior art hand-held laser scanner and data collection terminal.
Figure 1B:
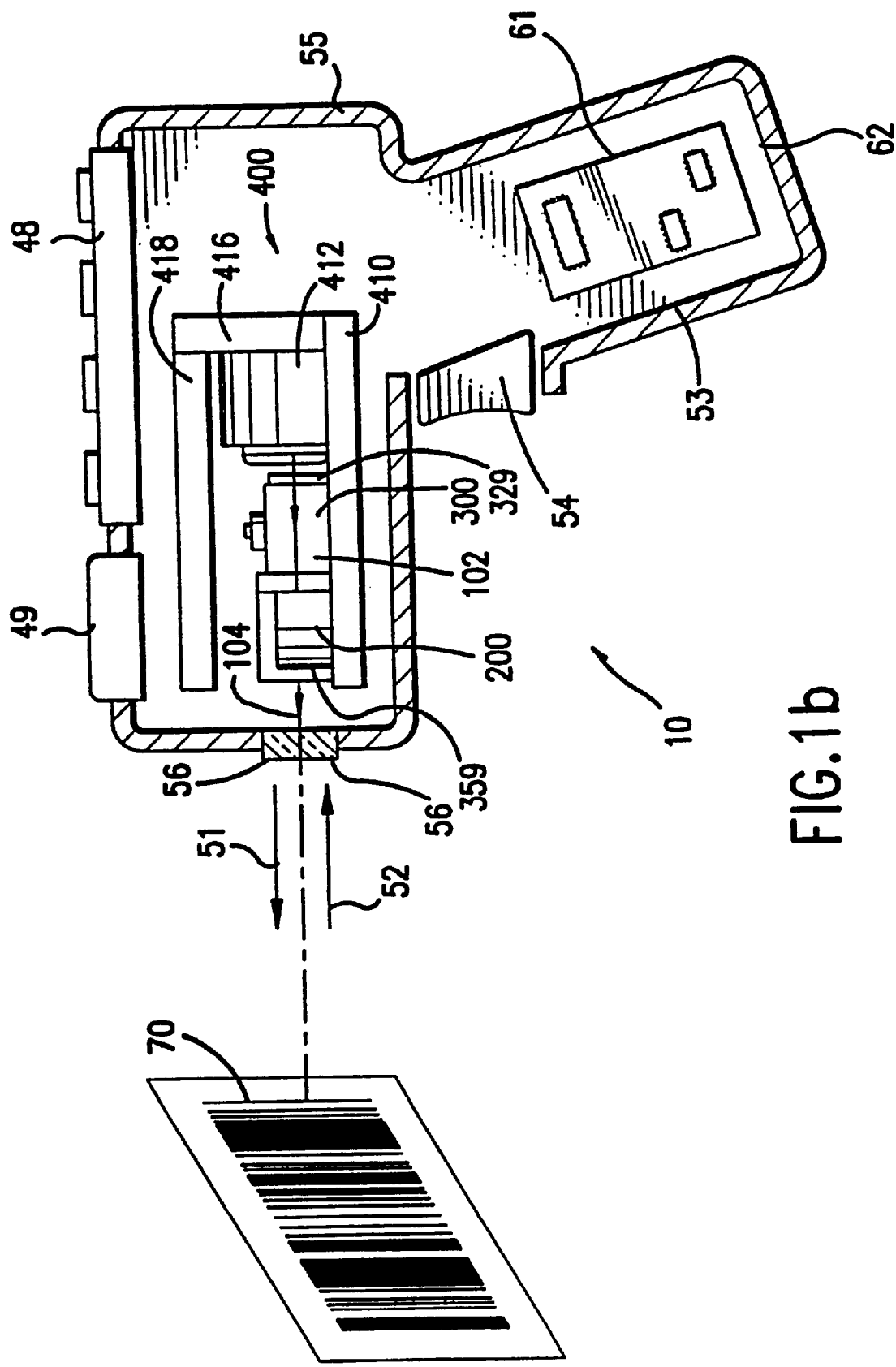
FIG. 1b is a schematic view of a hand-held gun-type scanner according to the present invention.

Referring to FIG. 1b one possible implementation of the scanning module 400 shown in FIGS. 2 to 6 or FIG. 7 (discussed in more detail below) is shown. As can be seen the module 400 is simply located and positioned within a gun-shape type reader 10. Where appropriate the same reference numerals are used as have been used throughout the description. The module 400 can be secured by any suitable means and is aligned such that the outgoing beam 104 issues in the scanning direction through scanning window 56. One or other of circuit boards 416,418 can alternatively be located in the pistol grip-type handle, or, as shown, an additional PC card can be retained separately in the handle. The ease of manufacturing of such an arrangement will be evident as the self-contained scanning module is simply positioned and secured appropriately within the gun-type scanner 10. If the additional PC card 61 is installed then this can also be easily secured in the handle 53 and connected to the module 400 in a conventional manner. The resulting device will have the advantages of the gun-type scanner together with the reduced size and weight benefits provided by the module of the present invention.

The flexible support structure could be modified to provide beam spot scanning in two directions which are substantially orthogonal to each other. A number of different scanning applications call for scanning in two different directions. One such application provides a scan pattern which moves across a bar code type indicia to find portions thereof which are sufficiently intact to permit an accurate reading of the code. Bi-directional scanning applications relate to scanning of indicia encoded in two different dimensions.

A two-dimensional bar code comprises a series of rows or lines of optically encoded information. Each row is oriented in the X-direction (horizontal), and a plurality of rows is located one above another in the Y-direction (vertical). Each row or line of information comprises a series of encoded symbols, and each symbol consists of a series of light and dark regions, typically in the form of rectangles. The widths of the dark regions, the bars, and/or the widths of the light spaces between the bars indicate the encoded information on each row or line. Two-dimensional bar codes can carry considerably more encoded information than the common one-dimensional codes.

To read a two-dimensional indicia, it is desirable to scan the indicia with a raster or similar type of scan pattern. In such a scan pattern, a fairly large number of substantially horizontal and substantially parallel scan lines traverse the indicia from an upper horizontal scan line, proceeding downwardly with a multiplicity of intermediate horizontal scan lines to a lower horizontal scan line to uniformly cover a desired scan area encompassing the indicia. In order to obtain such a raster-type scan pattern, the scanning component must be supported for reciprocal motion in two different directions. Also, the frequency of oscillation in a first direction producing the X-direction spot scanning motion typically is considerably higher than the frequency of oscillation in a second direction producing the Y-direction spot scanning motion.

FIG. 7a depicts another embodiment of a module, and is analogous to the FIG. 2 embodiment, except in the following two respects. First, a radio frequency transmitter 450 is mounted on the printed circuit board 418, and is coupled to a transmitting antenna 452 for broadcasting electrical signals to a remote host device. The signals can either be the digitized or the decoded signals generated by the scanner. The resultant "wireless scan module" can be employed in a myriad of applications.

FIG. 7a also shows a second casing 412' in which another laser diode is mounted, for emitting another light beam long a path portion 108 through an aperture in the scan mirror 212 for impingement on the reflector 359. This "dual laser" module is useful for multiple line scanning applications.

Although the present invention has been described with respect to reading one or two dimensional bar codes, it is not limited to such embodiments, but may also be applicable to more complex indicia scanning applications. It is conceivable that the method of the present invention may also find application for use with various machine vision or optical character recognition applications in which information is derived from other types of indicia such as characters or from the surface characteristics of the article being scanned.

In all of the various embodiments, the elements of the scanner may be assembled into a very compact package. Such a module can interchangeably be used as the scan engine for a variety of different types of data acquisition systems. For example, one or more modules may be alternately used in a hand-held scanner, a table top scanner attached to a flexible arm or mount extending over the surface of the table or attached to the underside of the table top, or mounted as a sub-component or subassembly of a more sophisticated data acquisition system. A plurality of modules may be spatially positioned so that several overlapping reference planes or fields of view may be scanned or imaged. Control or data lines associated with such components may be connected to an electrical connector mounted on the edge or external surface of the module to enable the module to be electrically connected to a mating connector associated with other elements of a data acquisition system.

An individual module may have specific scanning or decoding characteristics associated with it, i.e., operability at a certain working distance, or operability with a specific symbology or printing density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implemented within a self-contained data acquisition system including one or more such components as a keyboard, display, printer, data storage, application software, and data bases. Such a system may also include a communications interface to permit the data acquisition system to communicate with other components of a local area network or with the telephone exchange network, either through a modem or an ISDN interface, or by infrared or low power radio broadcast from the portable terminal to a stationary receiver.

Figure 8:
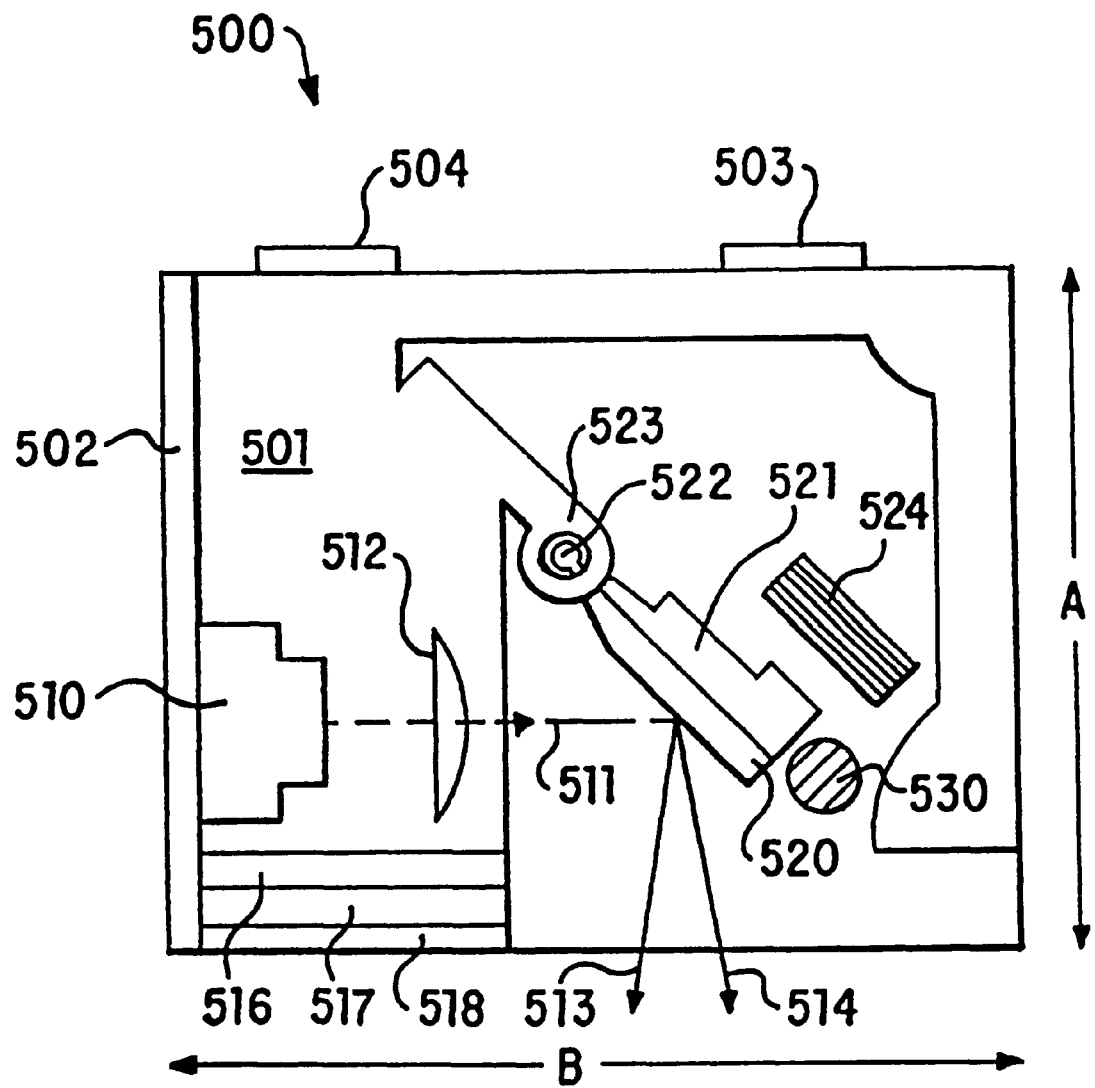
FIG. 8 shows a scanner module according to another aspect of the invention.

Referring now to FIG. 8 there is shown an alternative configuration for a scanning module generally designated 500. The module includes a laser 510 for generating a scanning beam 511 which passes through a lens system generally designated as 512. As in the previous embodiments, the scanning beam 511 is incident on a mirror 520 which is arranged to oscillate about a pivot point 521 to scan the beam as shown generally by arrows 513 and 514. The assembly is mounted on a circuit board 501 which includes an interconnect for a wall-forming circuit board (as discussed in relation to the previous embodiments) 502. As discussed above a further circuit board (not shown) is mounted parallel to the base circuit board 501. The means for mounting the module 500 are provided at 503 and 504. A receiving photodiode and suitable information processing means such as a filter and a louvre are provided at 516, 517 and 518 respectively. Those components receive and process the returning light beam in a manner generally known and discussed in relation to typically the size of the base board 501, relating to the dimensions A and B might be A=0.7" (17.8 mm) and B=0.75" (19.1 mm). The typical height might be in the region of 0.42" (10.67 mm).

The arrangement shown in FIG. 8 is particularly appropriate for miniature scan elements having, for example, the dimensions discussed above. In previous modules it has been noted that pointing errors arise in such miniature modules as a result of the difficulty of obtaining mass balance, which also gives rise to the problem of droop. This is particularly a problem when it is desired to achieve the low frequency scanning discussed above. The present invention overcomes the difficulties by using the particular mirror configuration shown. Looking at the configuration in more detail the mirror 520 is mounted on, or on a common body with a permanent magnet 521. The mirror system comprising the mirror 520 and the permanent magnet 520 pivot relative to a fixed point 523 on the base board 501 via a pivot shaft 522. The mirror system extends from one side of a pivot shaft 522 perpendicular to the pivot axis and the mirror 520 and permanent magnet 521 face in opposing directions relative to a nominal line extending perpendicular to the pivot shaft 522. The mirror system is driven for scanning motion by a coil 524 which produces an alternating magnetic field in a manner discussed with reference to the embodiments of FIGS. 2 to 6. The alternating magnetic field drives the permanent magnet 521 back and forth giving rise to the scanning motion. This configuration differs slightly from that discussed with reference to FIGS. 2 to 6 in that the mirror 520 and permanent magnet 521 are disposed both on the same side of the pivot shaft 522 rather than on opposing sides thereof.

In view of the miniaturisation of the system it is difficult to provide sufficient mass on the mirror system to increase the moment of inertia and hence reduce the frequency of oscillation by a sufficient amount. Even the mass that can be introduced tends to give rise to droop and the addition of any further mass would enhance that problem. This is overcome in the embodiment shown in FIG. 8 by introducing an additional magnetic element 530 positioned on the base board 501 in the vicinity of the permanent magnet 521. The element 530 can, for example, be an iron bar projecting from the base board 501. Because of the magnetic interaction between the iron bar 530 and the permanent magnet 521 the permanent magnet 521 and hence the mirror system as a whole are biased into alignment with the iron bar. An effective increase of the mass of the mirror system is thus achieved and pointing errors/droop are accordingly reduced. It will be appreciated, of course, that the iron bar can be replaced by any other suitable magnetic element 530.

According to another aspect of the invention there is provided a scanner module system adapted to overcome the difficulties associated with interference caused by ambient light in scanner environments.

This problem is particularly encountered with non-retrocollective bar code scanner systems in which the detector does not collect only the reading beam generated by the scanner, but also ambient light. This gives rise to inferior performance, especially in medium to high ambient light conditions. As will be appreciated the problem can be addressed by providing appropriate filters for the reflected light to filter out noise resulting from ambient light conditions. The spatial filtering of the noise is dictated by the scan pattern produced by the light received from the reflected bar code. The temporal filtering of the noise is dictated by the wave form produced by the light received from the reflected bar code. Typically the spectral filtering is determined by the following factors:

a) wavelength variation due to visible laser diode (VLD) manufacturing variability;
b) wavelength variation due to VLD aging;
c) wavelength variation with temperature for a given VLD;
d) dependence of optical transmission on the angle of the received light;
e) multiple mode lasing of VLD.

In order to accommodate all of the above factors, typically filters have a bandwidth of approximately 70 nm. This is orders of magnitude wider than the spectral width of a single VLD mode and, as a result, a large proportion of unnecessary noise caused by the ambient light conditions is retained. Furthermore the filtering parameters cannot be changed without an impact on the scanner performance.

Figure 9:
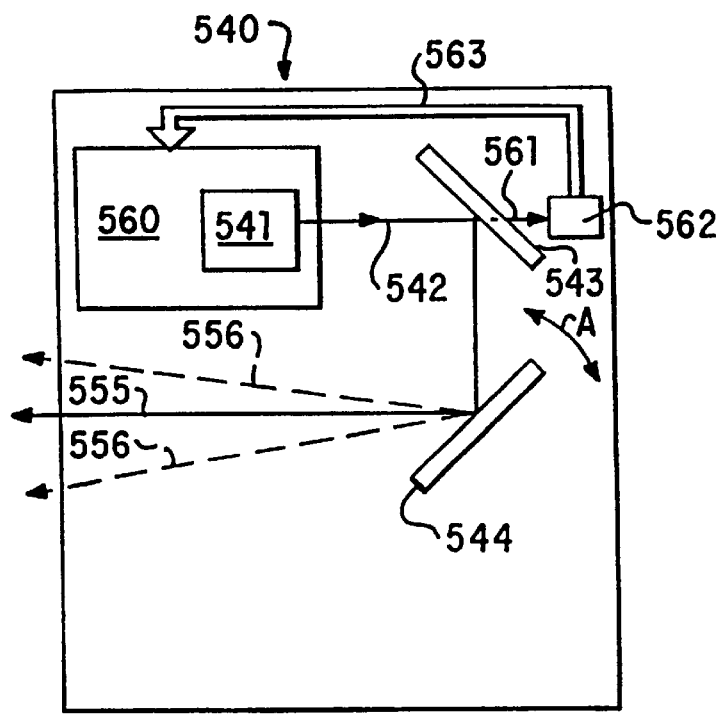
FIG. 9 shows a scanner module according to yet a further embodiment of the invention.

Referring to FIG. 9 one solution presented by the present invention is shown. The arrangement includes a fixed filter and a VLD having tuneable wavelength, the tuning parameter being the temperature of the VLD.

A scanner module is shown generally at 540. It will be appreciated that the components discussed below may be included on a single module of the type discussed with reference to the embodiments above or in any other appropriate form. The module 540 includes a laser 541 emitting a reading beam 542. The beam 542 is redirected by a reflector 543 onto a scanning system 544 represented in the figure by a single reflector which is removable to scan the beam 542 by reciprocating in a direction represented by arrow A. The resulting scanning beam is figuratively shown by main beam 555, the scanning limits being shown by broken lines 556,556'. In order to tune the wavelength of the laser 541 using temperature as the tuning parameter, the laser 541, which can be packaged on a sub-mount or in a chip form in any known manner is placed on a thermo-electric cooler/heater unit 560. The cooler/heater unit 560 can be of any known type, for example of the type where the temperature can be changed by varying the magnitude and direction of current flowing through it. As a result the wavelength of the laser 541 can be maintained within the pass band of the filter for the detector (not shown) and a narrower pass band can thus be used.

The temperature can be controlled in various ways, generally relying on a feed-back signal. For example reflector 543 can be partially silvered so as to reflect the majority of reading beam 542 but transmit a portion of the reading beam as shown at 561. The transmitted beam 561 is received by an auxiliary detector 562. The auxiliary detector 562 may be provided on the module 540, or maintained in the scanner housing as appropriate. The auxiliary detector 562 monitors the wavelength of the transmitted portion of the reading beam 561 and provides a control signal to the cooler/heater unit 560 such that a desired temperature is attained to maintain the wavelength of the reading beam 542 within the pass band of the filter. The control signals are passed via a control line 563. One way of controlling the temperature in this way is to tune the auxiliary detector 562 to provide maximum response at a desired wavelength within the pass band. The cooler/heater unit 560 temperature is controlled to maximise the output of the auxiliary detector 562.

This arrangement allows the wavelength of the reading beam 562 to be maintained within a desired band. As a result the filter can have a greatly reduced band width as the wavelength drift can be closely controlled. Accordingly the majority of the extraneous noise caused by ambient light conditions can be filtered out giving rise to improved signal to noise ratio and performance.

The embodiment shown in FIG. 9 is particularly well adapted to countering the wavelength variation occurring because of factors a) to c) above, namely manufacturing variability, aging the temperature as will be apparent. It will be appreciated that that embodiment will thus give rise to improved performance.

Figure 10:
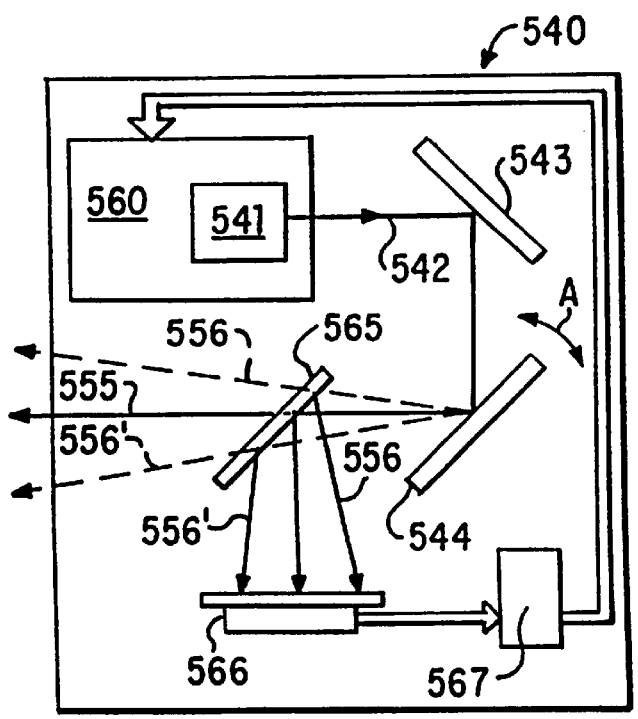
FIG. 10 shows an alternative embodiment of the scanner module shown in FIG. 9.

The performance can be further enhanced using the embodiment shown in FIG. 10 which additionally takes into account wavelength variation owing to dependence of the optical transmission on the angle of the received light. This is achieved by relocating the auxiliary detector such that it lies downstream of the scanning system 544. The redirecting reflector 543 can accordingly be wholly silvered. Instead a further partially silvered mirror 565 is placed in the path of the beam reflected by the scanning system 544 and covering the whole scan range such that a portion of the beams within the limits represented by numerals 556 and 556' are reflected and have redirected by the reflector 565. A detector 566 detects the redirected portion of the reading beam. The detector 566 detects both the wavelength of the reading beam (in a manner analogous to detector 562 discussed with reference to FIG. 9) and also provides instantaneous information as to the scan angle. This information is fed to a controller 567 (which may be any suitable processor) and the temperature of the cooler/heater unit 560 is controlled accordingly. Of course it will be appreciated that the controller 567 may be integral with the detector 566 or may form part of the controller for the module 542 as a whole. The wavelength of the laser 541 can accordingly be controlled to correct for variations in optical transmission dependent on the angle of the received light. It will be appreciated that the cooler/heater unit 560 and laser temperature must be varied at a rate fast enough to follow the variations in the scan angle in order for this embodiment to operate. This can be achieved of course for sufficiently slow scan rates, and faster scan rates can be accommodated by minimising the thermal mass of the entire cooler/heater unit 560 and laser 541 system.

The system can be yet further improved to take account of variations arising as a result of factor e), the fact that some VLD's lase at several spectral modes, by selecting a suitable VLD that lases in a single longitudinal mode. Various VLD's are known that would meet this requirement, for example most index-guided VLD's. It will be appreciated that even if the VLD lases in a few modes, improvements will be recognised although they will not be of significance.

Figure 11:
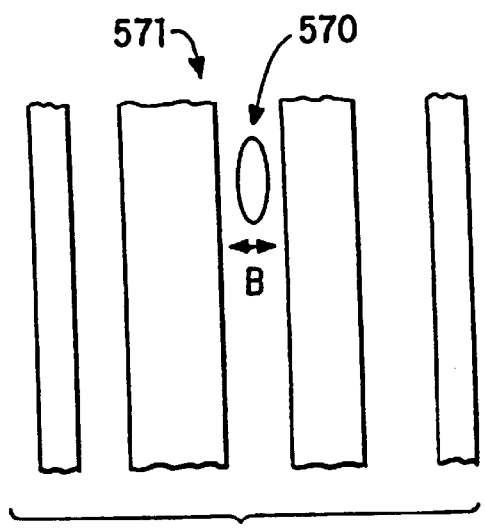
FIG. 11 shows a nominal bar code symbol and reading beam spot.

In an alternative approach a VLD of fixed wavelength can be incorporated and a tuneable filter can instead by used. In that case the control signals received from the auxiliary detector 562, or combined wavelength and scan angle detector 566 would be fed to the filter such that the filter followed variations in wavelength of the laser 541. Suitable tuneable filters are known, for example, from Optical Engineering Volume 20, No. 6 (November/December 1981) pages 805 to 845 which comprises a collection of several articles on electronically tuneable optical spectral filters. As will be appreciated the remaining features of the system would be similar to those described with reference to FIGS. 9 and According to a further aspect of the invention it is desired to improve the reading of poor quality one-dimensional bar code symbols. It is known to enhance accuracy when reading one-dimensional bar code symbols by using a reading beam having an elliptical cross section, the long axis lying parallel with the bar direction or space direction, as shown in FIG. 11. The reading beam spot is shown exaggerated at 570 and scans as shown by arrow B along a bar code symbol 571. The reading beam spot 570 is elliptical having its long axis parallel to the direction of the bars and perpendicular to the scan direction. As a result an averaging of the code defects in the vertical direction is provided.

Figure 12:
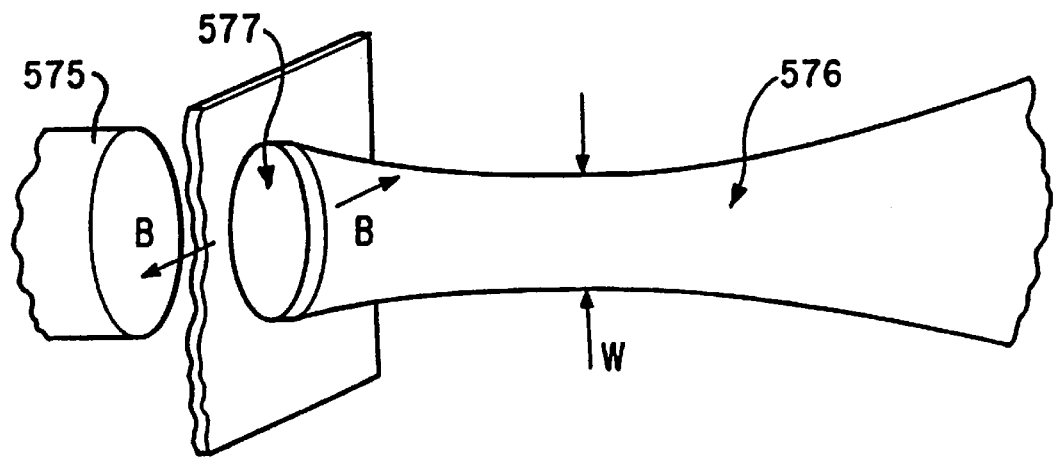
FIG. 12 shows a laser focusing aperture and a beam waist.

It is desirable to increase the working range of a given scanner in order that the scanner is more versatile. In order to increase the scanner working range for high density bar codes (6 to 10 mil), the far end of the working range can be increased by increasing the laser focusing aperture size in the scanning direction, whilst the near end of the working range can be decreased by bringing the beam waist closer to the aperture. This is shown figuratively in FIG. 12. A laser 575 emits a beam 576 through a circular focusing aperture 577. The beam 576 has a waist shown exaggerated at W. By increasing the aperture size in the scanning direction (shown again by arrow B) the working range increases but the beam waist decreases. As a result, if a badly printed bar code symbol is scanned close to the laser beam waist, the reading beam spot will be increased in size as a result of which there will be less averaging out of imperfections in a bar code symbol in the scanning direction, causing noise in the read-out signal which cannot be filtered out by using an elliptical spot elongated perpendicular to the scan line. It is desirable to remove or reduce this performance degradation which will have an adverse effect on the working range.

The present invention solves the difficulties with the known arrangements by identifying a parameter of the system that can be varied to improve conditions, namely the laser focusing aperture shape. Particular preferred shapes are described hereafter. It is found that if the focusing aperture shape is optimised, the laser beam waist can be increased and a correspondingly improved signal to noise ratio obtained for poor quality bar code symbols without sacrificing the scanner working range.

Figure 13A:
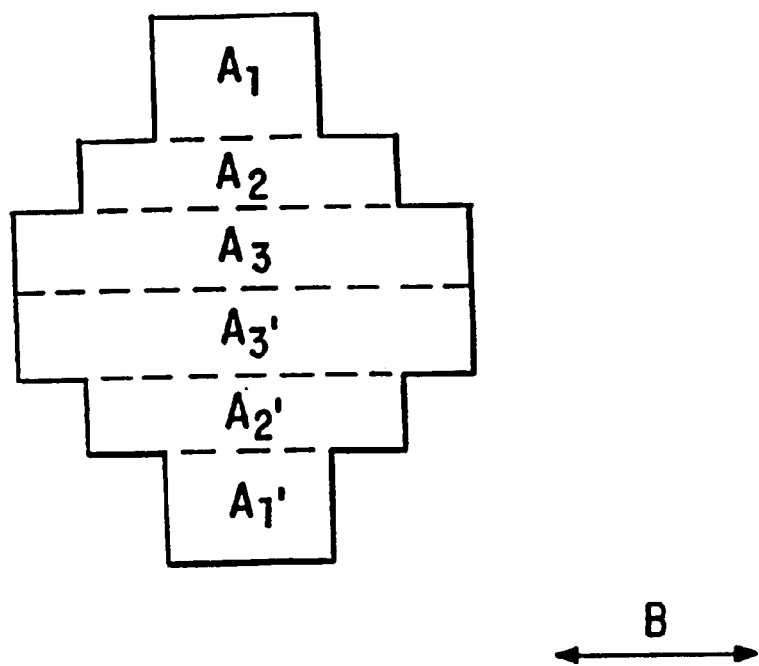
FIG. 13a shows an improved aperture shape.
Figure 13B:
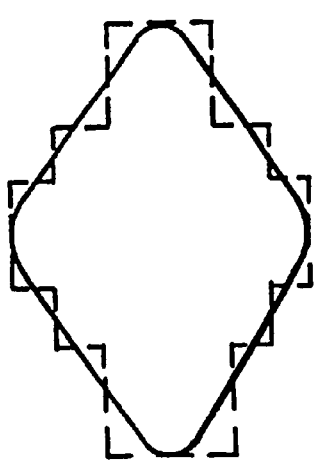
Figure 13C:
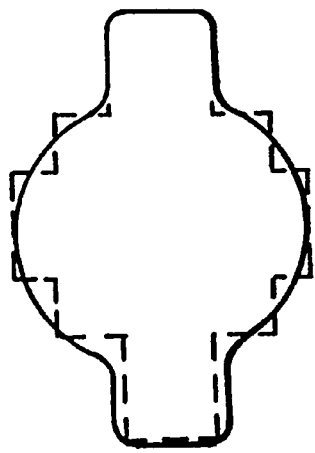

Conventional aperture shapes are generally circular or rectangular as a result of which the only parameters available for increasing the scanner working range are the aperture size and the beam waist location; this gives rise to the decrease in the beam waist and the working range is increased as discussed above. Various alternative aperture shapes are shown in FIGS. 13a to 13c. Referring to FIG. 13a an optimised aperture having a stepped shape is shown. The aperture can be considered as being formed by a series of rectangles A1, A2, A3, A1', A2', A3' arranged symmetrically as shown. The rectangles of each pair A1, A1' etc have sides of different length in the scan direction (shown once again by arrow B). The widest rectangles are found at the centre, the narrowest at the top and bottom.

In order to make the manufacturing process easier, and to decrease light scattering at sharp corners, various alternative smooth shapes can be selected approximating the shape shown in FIG. 13a. For example as shown in FIG. 13b a rounded corner diamond shape could be used or in FIG. 13c a circular shape having upper and lower rounded lobes extending therefrom.

In fact the optimised aperture shape shown in FIG. 13a can be arrived at by MTF analysis, where MTF is the convolution integral for the aperture function. We now turn to mathematical treatment of the aperture shape using MTF analysis.

We assume that a scanner is intended to read 6, 7.5, 20 and 55 mil code. Typically, after optimisation of scanner working ranges, MTF for the highest code density (6 mil in our example) changes vs. target distance as illustrated by the cross-marked curve in FIG. 14. Let us assume that a digitizer can provide a reading at MTF>15%. In the shown example, a scanner having rectangular aperture of 0.027" (0.686 mm) width, would provided the working range from 2.5" (63.5 mm) to 9" (228.6 mm) for the 6 mil bar code.

The MTF curve for the 6 mil code reaches a maximum value of about 45% at the beam waist location at 5" (130 mm) from the scanner. Nothing is added to the scanner performance by having maximum MFT significantly higher than the threshold value of 15%. Instead, the scanner resolves higher spatial frequencies representing the printing defects, and a noise level increases the beam around the beam waist location. Ideally, a flat MTF curve just above the threshold level is desirable. In other words, the beam waist can be increased until the flat MTF curve is reached.

Accordingly the additional degree of freedom in order to control the shape of the MTF curve is employed, namely the aperture shape when reading one-dimensional bar codes. For the aperture shown in FIG. 13a consisting of three rectangular areas with different sides along the scan direction x1, x2, and x3, taking into account, that MFT is the convolution integral for the aperture function, one can calculate the MFT of the shown aperture by the following formula:

$$MTF = (MTF1.S1 + MFT2.S2 + MTF3 + \ldots)/(P1 + P2 + P3 \ldots)$$

where MTFi is the MTF of i-th zone of the aperture, Pi is the laser beam power within the i-th zone. Therefore, we have an additional design freedom by shaping the aperture. An example of the aperture, providing the flat MTF for the 6 mil code is in FIG. 13a. Calculated MTF for the 7.5 mils, 20 mil and 55 mil codes respectively are shown by the solid lines in FIGS. 15 to 17. One can expect that all printing defects with size less than 6 mil will be filtered out.

Figure 16:
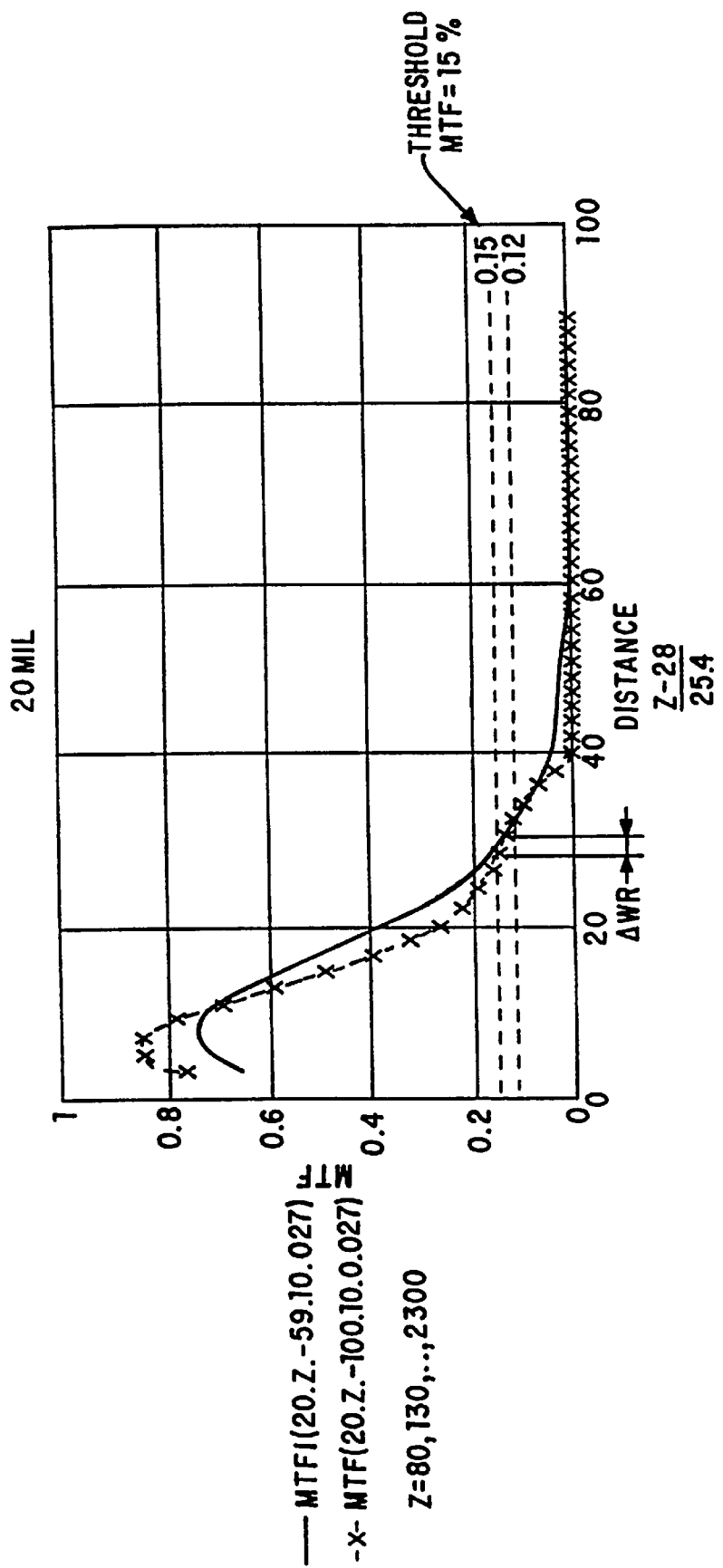
FIG. 16 shows an MTF curve for a 20 mil density bar code.
Figure 17:
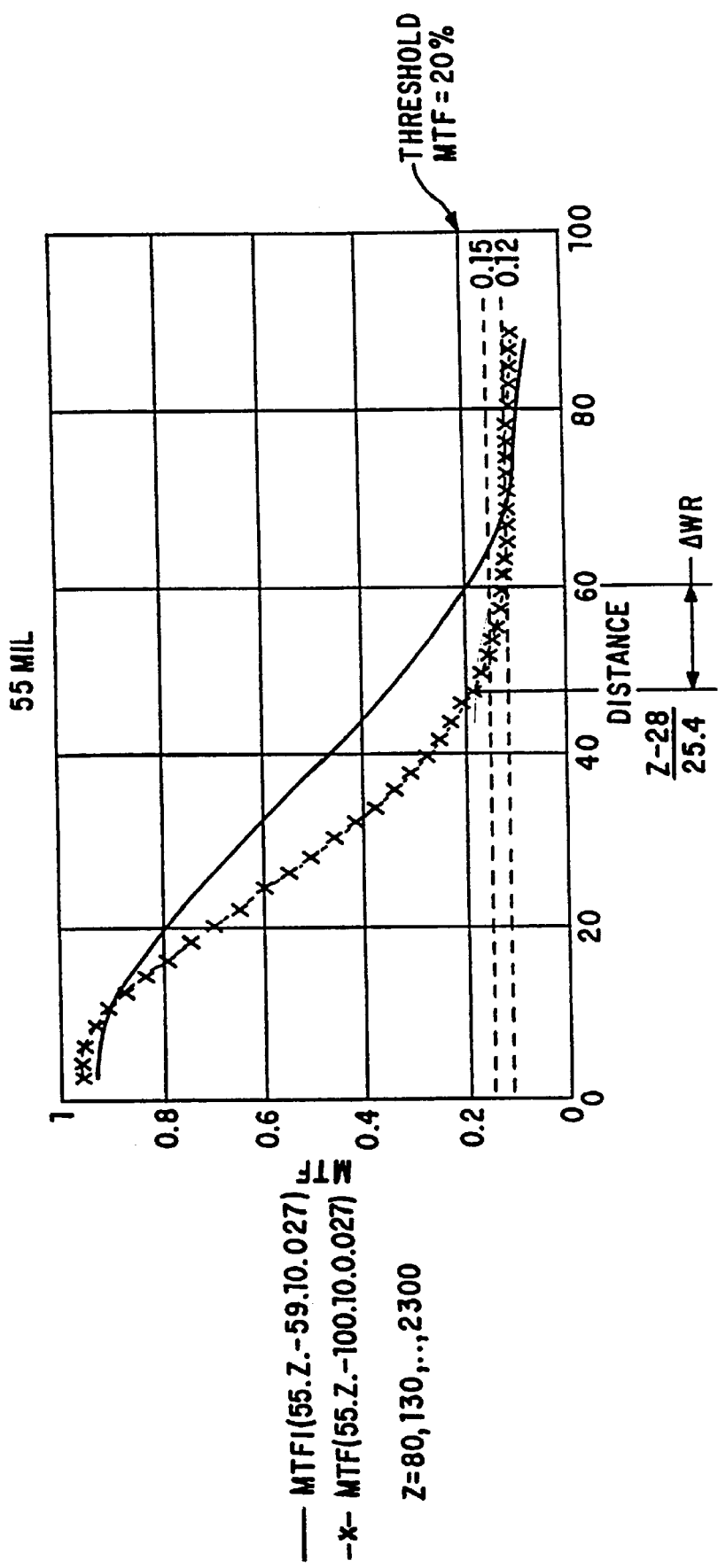
FIG. 17 shows an MTF curve for a 55 mil density bar code.

Another possibility of the aperture shape optimization is to increase working ranges for the low density bar codes (40, 55 mil) when keeping wide ranges for high density bar codes as one can see from FIGS. 16 and 17.

Figure 14:
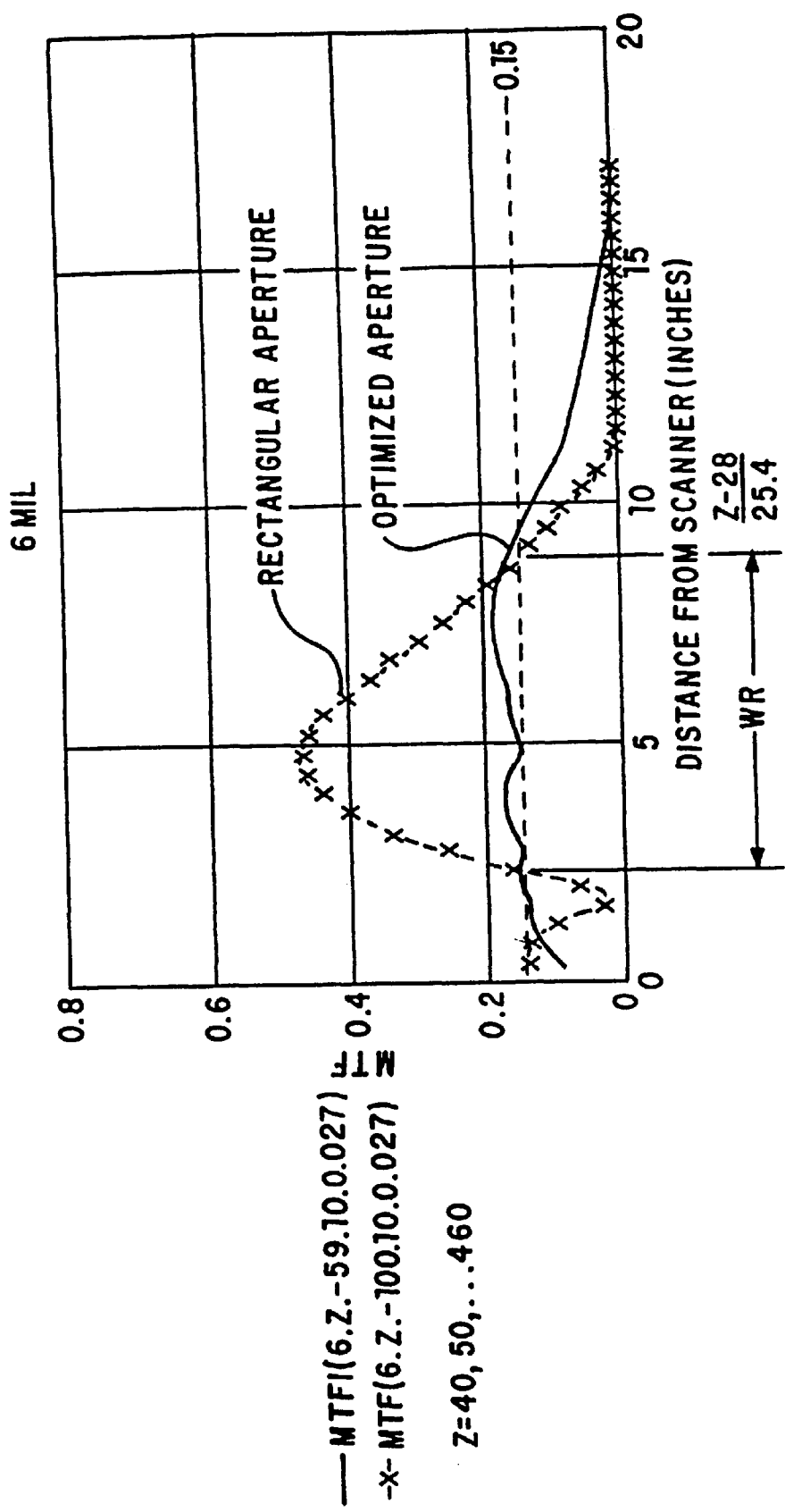
FIG. 14 shows a nominal MTF curve based on aperture shape for a 6 mil density code.

Referring to FIG. 14, the nominal MTF curve function for the "diamond" aperture and a 6 mil code is given by:

$$MTF1(wb, Z, x, Ox, Ax) = \\ MTF(wb, Z, x, ex, Ax + 0.011) + \\ \frac{MTF(wb, Z, x, ex, Ax) + MTF(wb, Z, x, ex, Ax - 0.011)}{3}$$

Where wb is the code density, Z is the distance from the aperture (mm), x is the distance between the laser and the lens focal plane ($\mu$m), e is the laser divergence angle and Ax is the aperture size of the relevant portion of the aperture (inches). The numerical values given correspond to the embodiment of FIG. 13a.

The distance WR is the working range as defined hereabove, and the MTF curves are shown for a rectangular aperture (curve marked with crosses) and an optimized aperture (solid line). The threshold value of MTF=15% is shown with a dotted line, defining the working range WR.

Figure 15:
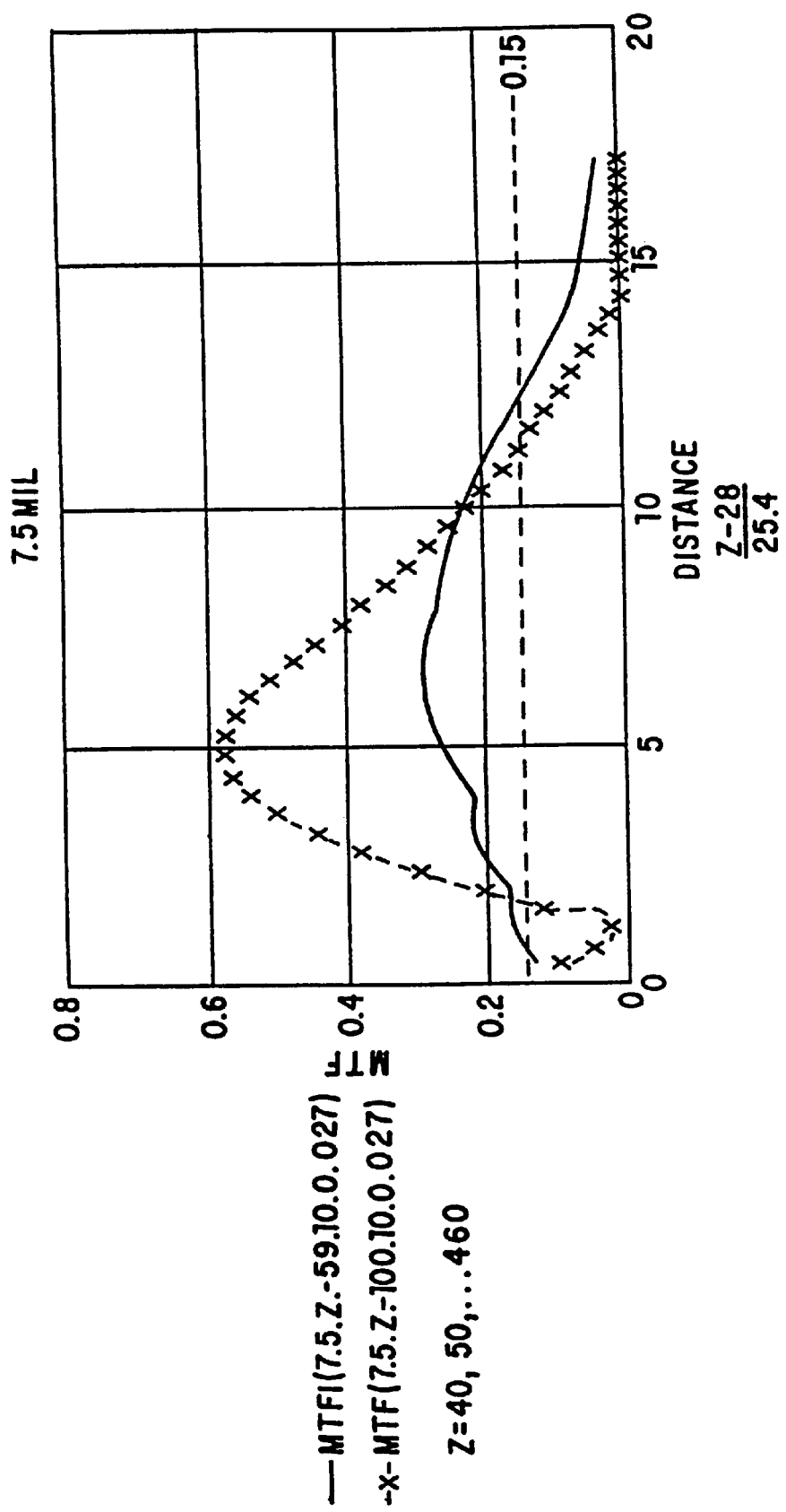
FIG. 15 shows an MTF curve for an aperture shape for a 7.5 mil density bar code.

FIGS. 15 to 17 use the same convention but for codes of 7.5 mil, 20 mil and 55 mil respectively. The improvement in working range is represented by ΔWR. With respect to FIG. 17 a threshold value of 20% is selected which is achievable, as discussed above, for such low density bar codes.

According to another aspect of the invention the problem of dead zone reduction for small scan modules is addressed.

Figure 19:
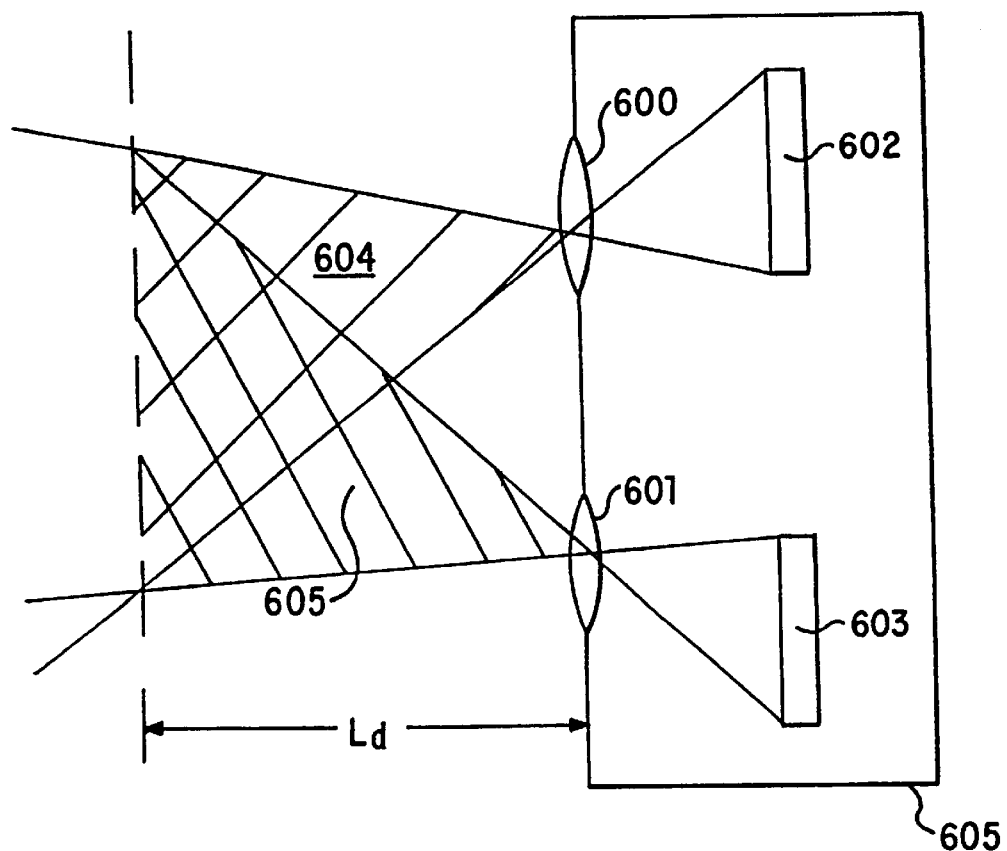
FIG. 19 shows a conventional two photodiode detector system from above.
Figure 20:
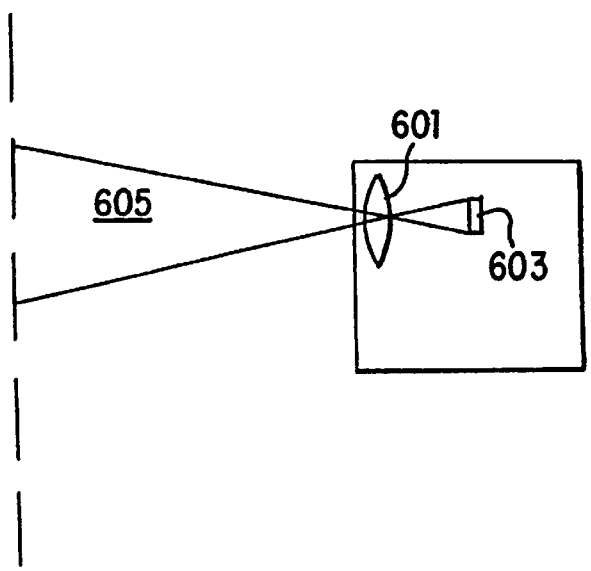
FIG. 20 shows the system of FIG. 19 from one side.
Figure 21:
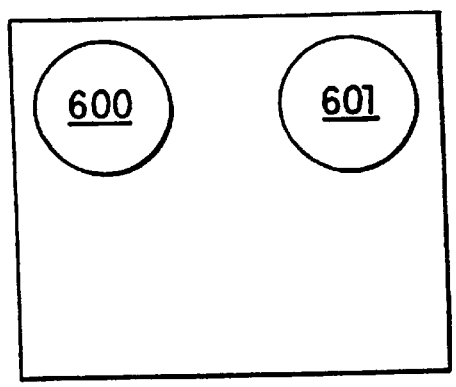
FIG. 21 shows the system of FIG. 19 from the front.

Referring to FIG. 19 a conventional design for improving the performance of small non-retro collective (one-dimensional and two-dimensional) scan modules is shown from above. A pair of lenses 600,601 are associated with respective detectors (for example photodiodes) 602,603 in a scanner module 605 of any type, for example the module type described above with reference to other embodiments of the invention. Other components of the scanner module 605 such as a laser etc. are not shown. The lenses serve to reduce the field of view and hence remove a portion of the background noise and ambient light. The lenses 600,601 also amplify the signal collection area of the respective detectors 602,603 thereby increasing the signal to noise ratio. The signals from both detectors 602,603 are summed in a summing means of conventional type (not shown). Where the field of view of each detector is shown as a respective opposing hatched region 604 and 605 respectively it will be seen that there is a region of non-overlap referred to as the "dead zone" represented by distance $L_d$. It will be appreciated that within this region a non-uniform signal will result when attempting to scan a printed indicia within this zone. In particular the centre of the summed signal will either be null or twice the amplitude of its ends. The dead zone defines a no-decode region as a result of which decoding near the "nose" or output window of the physical scan module is not achievable. It will be appreciated that such decoding is often desirable, but if the photodiodes are moved back in order to have the field of view cover the "dead zone" working range is lost. A side view and front view of the arrangement of FIG. 19 are shown in FIGS. 20 and 21 respectively.

Figure 22:
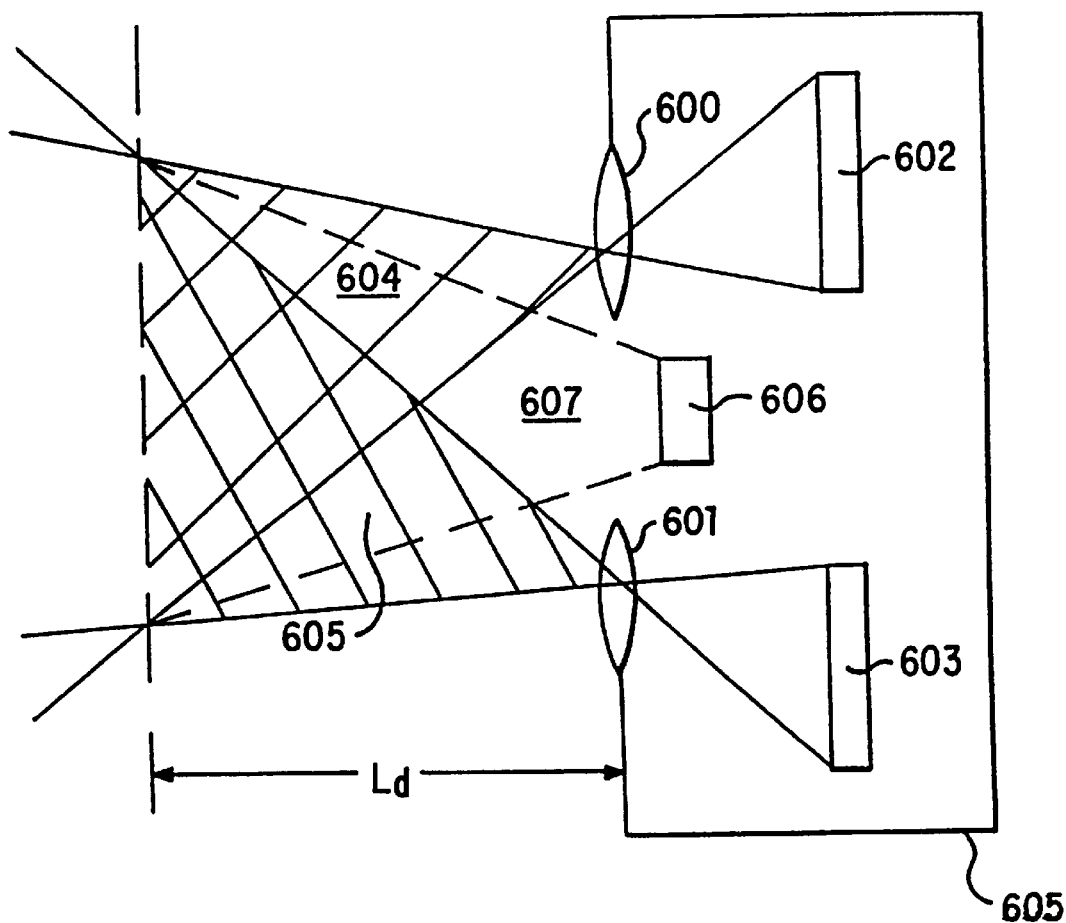
FIG. 22 shows an improved detector system according to the present invention from above.
Figure 23:
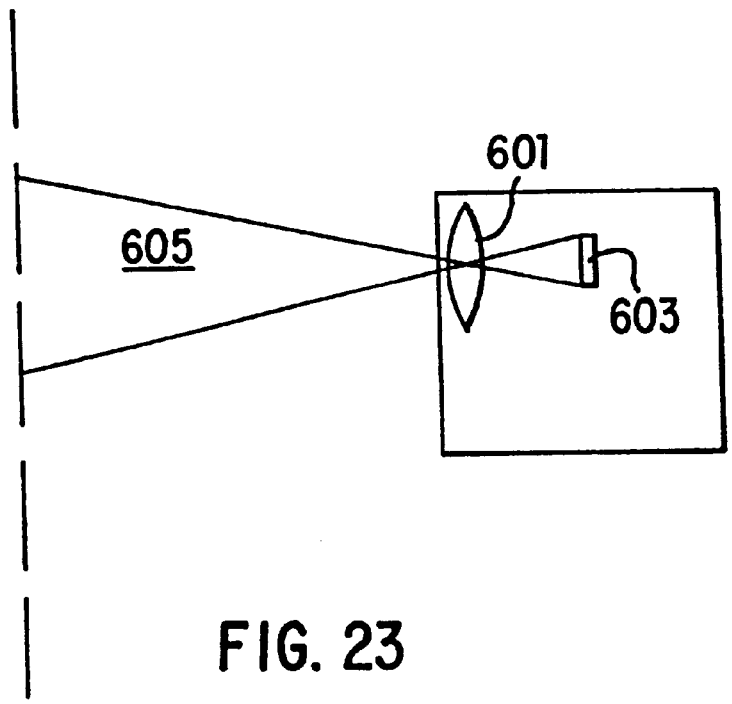
FIG. 23 shows the system of FIG. 22 from one side.
Figure 24:
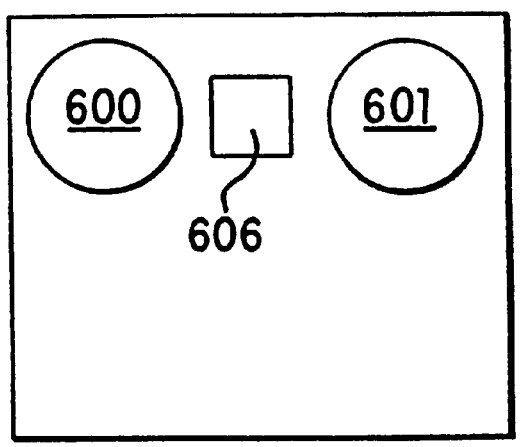
FIG. 24 shows the system of FIG. 22 from the front.

The solution proposed by the present invention is shown in the plan view of FIG. 22. In addition to the two detectors 602,603 a third photodiode detector 606 is located centrally in the module 605. The field of the view of the third detector 606 shown in dotted lines and represented by reference numeral 607. It will be seen that the third detector 606 will detect signals within the dead zone, providing additional working range without sacrificing the working range of principal detectors 602,603. Because the signal closer to the scanner module 605 is of relatively good quality and much larger than it is further out, a small photodiode detector will suffice. A smaller photodiode detector need not decode beyond the distance $L_d$ since the two larger detectors cover that area sufficiently. The smaller detector 606 is particularly of assistance in decoding near end indicia on the axis. In order for the pattern to appear suitably large, the laser path can be folded using a suitable system of mirrors. This can mean that the two principal detectors 602,603 have to be moved further apart, but once again the third detector 605 alleviates the situation by covering the dead zone. A side view and a front view of the arrangement according to the present invention is shown at FIGS. 23 and 24 respectively.

According to a yet further aspect of the invention it is desired to obtain multi-bit performance with minimal or no modification of existing components. Various non-multi-bit scan modules are well known. This component is incorporated with a scanning module or engine of the type discussed with reference to FIGS. 1 to 7 above and in particular includes a scanning signal input, a scanning signal digitizer and a digitized signal output together with an analogue signal differentiator and output. It has previously been thought non viable to introduce a multi-bit version of such components as, unless an application specific integrated circuit (ASIC) were introduced there would be no room on the small circuit boards provided in conventional scanning modules for the additional multi-bit circuitry. In addition, multi-bit scan modules, even were they achievable, would be incompatible with decoders in all existing portable terminals.

The present invention overcomes these problems by maintaining the current scanning modules but making use of the existing components in such modules to interface with a multi-bit decoder in an improved manner.

An example of the invention is shown in FIG. 25. A scanning module of the type described with reference to FIG. 2 (although any appropriate module can be used) is shown at 620. Only those components relative to the signal processing are shown. The module 620 includes a signal input 621 and a digitizer 622 arranged to convert the analogue input signal to a digital output 623. The digital output is held at an interface pin 624. This allows the scanning module to be used in true modular form, arranged to interface with a suitable decoder module. In addition to the digitizer 622 an analogue signal differentiator 625 is also provided. The output differentiated signal 626 is held at a second interface pin 627. Conventional non-multi-bit systems have not made use of the second interface pin.

Referring to FIG. 26 a decoder module 630 is shown. For a non-multi-bit decoding the digitized signal 623 is received from interface pin 624 and decoded in decoder 631. The differentiated signal 626 interface pin 627 is not used; the decoder uses the standard digitizer bar pattern signal provided by the digitizer 622 on the scan board 620.

Multi-bit performance can be achieved with an appropriate decoder by using the differentiator signal 626 in conjunction with the digitized bar pattern signal from the digitizer 622. An analogue to digital convertor 632 is included as part of the decoder module 630. When the decoder 631 detects a transition of the digitizer output from the scan engine it sends a signal via line 633 to a controller 634 causing the analogue to digital convertor 632 to sample the differentiated signal. The analogue to digital convertor 632 therefore provides edge strength information to the decoder 631 via lines 635. The scanning module digitizer 622 supplies edge location and polarity information. The main principles of multi-bit signal processing are well known in the art and will not be explored in detail here, but it will be seen that the parameters of interest can thus be monitored.

The analogue to digital convertor 632 can either be a separate integrated circuit on a decoder board (as shown in FIG. 26) or can be included in the decode microprocessor chip itself. A suitable microprocessor chip is produced by Toshiba.

In cases where there are two positive or negative edges in a row in the input signal 621, the conventional digitizer is very sensitive such that even for a very small negative peak between two positive peaks or vice versa the digitizer 622 will detect all of the edges and the weaker ones will be rejected using strength data in a conventional manner. It is been found that this does not lead to any significant cause of degradation of the signal processing.

Figure 18:
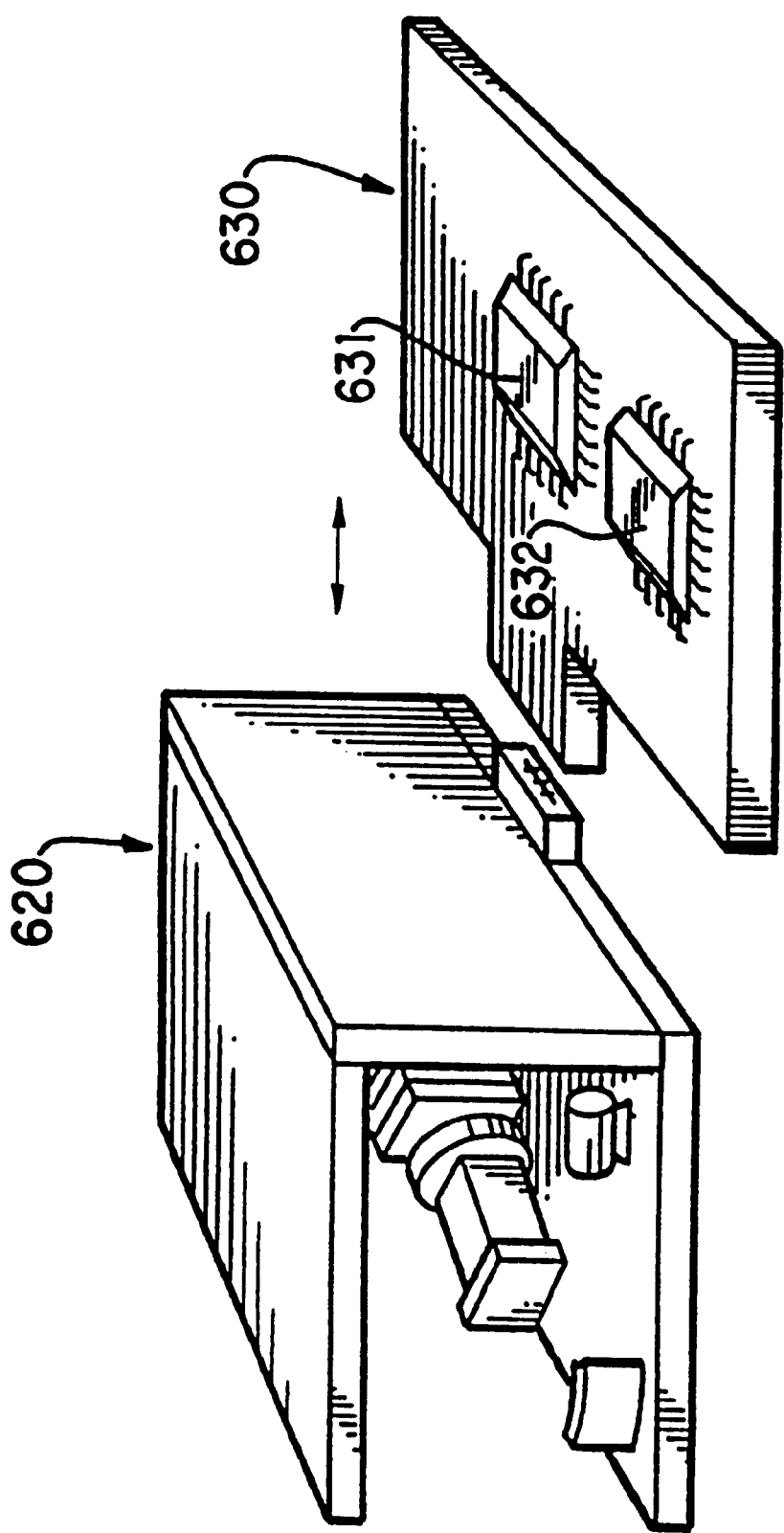
FIG. 18 shows a schematic interconnection between a scanning module and a decoder module.

FIG. 18 shows schematically the connection between the scan module 620 and the decoder module 630.

It will be seen that the improved multi-bit modular arrangement can be incorporated with the design discussed with reference to FIGS. 1–7 allowing yet further improvement in the interchangeability and modularity of the arrangement, and a yet wider range of applications for the basic retroreflective scan module described therein.

According to another aspect of the invention it is desired to incorporate dual or multiple lasers, and in particular dual-diode performance scanner functionality into increasingly small applications to meet the desired size/ergonomic considerations involved.

According to the invention, of which an embodiment is shown in FIG. 27, the dual-diode (ER) arrangement includes a first laser 700 focused for long range scanning and a second laser 702 focused for short range scanning. In order to obtain the small sizes requires the long range laser 700 is placed in a "back to back" configuration behind the short range laser 702. The long range laser beam 704 is folded around the short range laser 702 by mirrors 706 and 708. The short range laser beam 710 is folded by mirror 712. According to one embodiment the two beams are recombined at 714 via a "special mirror" 716. The special mirror can be partially silvered or slotted so as to reflect the short range beam 710 but transmit the long range beam 704. Alternatively the special mirror 716 could be off-set from the long range beam path 704 to allow the long range beam 704 to pass the special mirror 716.

In addition to allowing reduced size, it will be seen that this implementation could be incorporated using existing modules, merely including the additional components in the available space. Where a modular arrangement of the type discussed herein was used in will be seen that capability for adding additional lasers and components could easily be incorporated giving rise to greater adaptability and re-useability of existing components. It is certainly envisaged that the arrangement of FIG. 27 could be incorporated with the modular arrangement described with reference to FIGS. 1–6 above.

It will be understood that each of the features described above, or two or more together, may find a useful application in other types of scanners and bar code readers differing from the types described above.

While the invention has been illustrated and described as embodied in a retroreflective scan module for electro-optical readers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint or prior art, fairly constitute essential characteristics of the generic or specific aspects of this invention and, therefore, such adaptations should and are intended to be comprehended within the meaning and range of equivalence of the following claims. What is claimed as new and desired to be protected by Letters Patent is set forth in the appended claims.

What is claimed is:

1. A wireless communications module, comprising:
   a) a support having a base lying in a first plane;
   b) a data acquisition system including a light source on the base for directing a light beam at an indicium for reflection therefrom, and a light detector on the support for detecting light reflected from the indicium and for generating an electrical signal corresponding to the indicium;
   c) a first printed circuit board on the support and lying in a second plane generally orthogonal to the first plane;
   d) drive circuitry on the first printed circuit board for driving the light source;
   e) a second printed circuit board on the support and lying in a third plane generally orthogonal to the second plane and generally parallel to the first plane;
   f) signal processing circuitry on the second printed circuit board for processing the electrical signal to obtain a processed signal; and
   g) transmitter circuitry on the second printed circuit board for transmitting the processed signal at radio frequency away from the support.

2. The module of claim 1, wherein the transmitter circuitry includes an antenna for transmitting the processed signal to a remote host device.

3. The module of claim 1, wherein the processed signal is a digital signal.

4. The module of claim 1, wherein the transmitter circuitry includes a low power transmitter for transmitting the process signal to a local area network.

5. The module of claim 1, wherein the transmitter circuitry includes a low power transmitter for transmitting the processed signal to a telephone exchange network.

6. The module of claim 1, wherein the transmitter circuitry includes a low power transmitter for transmitting the processed signal to a stationary receiver.

7. The module of claim 1, wherein the data acquisition system includes a scanner for scanning at least one of the light beam and a field of view of the light detector.

8. The module of claim 7, wherein the scanner includes a reflecting scan mirror mounted on the support for oscillating movement, and drive means for oscillating the scan mirror.

9. A mobile data collection terminal, comprising:

A) a housing supported by a user; and

B) a wireless communications module in the housing, including
   a) a support having a base lying in a first plane;
   b) a data acquisition system including a light source on the base for directing a light beam at an indicium for reflection therefrom, and a light detector on the support for detecting light reflected from the indicium and for generating an electrical signal corresponding to the indicium;
   c) a first printed circuit board on the support and lying in a second plane generally orthogonal to the first plane;
   d) drive circuitry on the first printed circuit board for driving the light source;
   e) a second printed circuit board on the support and lying in a third plane generally orthogonal to the second plane and generally parallel to the first plane;
   f) signal processing circuitry on the second printed circuit board for processing the electrical signal to obtain a processed signal; and
   g) transmitter circuitry on the second printed circuit board for transmitting the processed signal at radio frequency away from the support.

10. The terminal of claim 9, wherein the transmitter circuitry includes an antenna for transmitting the processed signal to a remote host device.

11. The terminal of claim 9, wherein the processed signal is a digital signal.

12. The terminal of claim 9, wherein the transmitter circuitry includes a low power transmitter for transmitting the processed signal to a local area network.

13. The terminal of claim 9, wherein the transmitter circuitry includes a low power transmitter for transmitting the processed signal to a telephone exchange network.

14. The terminal of claim 9, wherein the transmitter circuitry includes a low power transmitter for transmitting the processed signal to a stationary receiver.

15. The terminal of claim 9, wherein the data acquisition system includes a scanner for scanning at least one of the light beam of a field of view of the light detector.

16. The terminal of claim 15, wherein the scanner includes a reflecting scan mirror mounted on the support for oscillating movements, and drive means for oscillating the scan mirror.

* * * * *